US011238297B1

(12) United States Patent
Ruepp et al.

(10) Patent No.: US 11,238,297 B1
(45) Date of Patent: Feb. 1, 2022

(54) INCREASING ROBUSTNESS OF COMPUTER VISION SYSTEMS TO ROTATIONAL VARIATION IN IMAGES

(71) Applicant: Apple Inc., Cupertino, CA (US)

(72) Inventors: Oliver Thomas Ruepp, Baierbrunn (DE); Vimal Thilak, Daly City, CA (US)

(73) Assignee: APPLE INC., Cupertino, CA (US)

( * ) Notice: Subject to any disclaimer, the term of this patent is extended or adjusted under 35 U.S.C. 154(b) by 140 days.

(21) Appl. No.: 16/580,223

(22) Filed: Sep. 24, 2019

Related U.S. Application Data

(60) Provisional application No. 62/895,368, filed on Sep. 3, 2019, provisional application No. 62/737,584, filed on Sep. 27, 2018.

(51) Int. Cl.
| | |
|---|---|
| *G06K 9/32* | (2006.01) |
| *G06T 3/60* | (2006.01) |
| *G06K 9/46* | (2006.01) |
| *G06N 3/08* | (2006.01) |
| *G06N 3/04* | (2006.01) |
| *G06T 7/73* | (2017.01) |

(52) U.S. Cl.
CPC ......... *G06K 9/3208* (2013.01); *G06K 9/4604* (2013.01); *G06N 3/04* (2013.01); *G06N 3/08* (2013.01); *G06T 3/60* (2013.01); *G06T 7/73* (2017.01); *G06T 2207/20084* (2013.01); *G06T 2207/30244* (2013.01)

(58) Field of Classification Search
CPC .................. G06N 3/08; G06N 3/0454; G06T 2207/20084; G06T 2207/20081; G06K 9/6256; G06K 9/4628
See application file for complete search history.

(56) References Cited

U.S. PATENT DOCUMENTS

| | | | | |
|---|---|---|---|---|
| 2008/0317370 | A1* | 12/2008 | Florent | G06T 5/20 382/260 |
| 2013/0215264 | A1* | 8/2013 | Soatto | G06T 7/207 348/143 |
| 2015/0245020 | A1* | 8/2015 | Meier | G06T 7/70 348/135 |
| 2018/0122136 | A1* | 5/2018 | Lynen | G06T 7/73 |

(Continued)

OTHER PUBLICATIONS

Takeda et al., "Kernel Regression for Image Processing and Reconstruction," IEEE Transactions on Image Processing, vol. 16, No. 2, Feb. 2007. (Year: 2007).*

(Continued)

*Primary Examiner* — Ross Varndell
(74) *Attorney, Agent, or Firm* — Fernando & Partners, LLP

(57) ABSTRACT

In one implementation, a method includes: obtaining an input image, wherein the input image is captured by an image sensor having a rotational orientation with respect to a direction of gravity; obtaining a gravity direction estimation associated with the rotational orientation of the sensor; generating, from the input image, a rotationally preprocessed input image by applying one or more transformations to the input image based on the gravity direction estimation; providing the rotationally preprocessed input image to the machine learning sub-system; and identifying, using the machine learning sub-system, a visual feature within the rotationally preprocessed input image.

24 Claims, 22 Drawing Sheets

(56) References Cited

U.S. PATENT DOCUMENTS

2019/0346280 A1* 11/2019 Mutschler .............. G01C 21/16
2020/0037998 A1* 2/2020 Gafner ................. A61B 8/5207
2021/0004933 A1* 1/2021 Wong ...................... G06T 7/248

OTHER PUBLICATIONS

William T. Freeman et al., "The Design and Use of Steerable Filters", IEEE Transactions on Pattern Analysis and Machine Intelligence, vol. 13, No. 9, Sep. 1991, pp. 891-906.
Maurice Weiler et al., "Learning Steerable Filters for Rotation Equivariant CNNs", Computer Vision Foundation, pp. 849-858.

* cited by examiner

600

Circular Harmonic Basis Filters 1100

INCREASING ROBUSTNESS OF COMPUTER VISION SYSTEMS TO ROTATIONAL VARIATION IN IMAGES

CROSS REFERENCE TO RELATED APPLICATIONS

This application claims the benefit of U.S. Provisional Patent Application Nos. 62/737,584, filed Sep. 27, 2018 and 62/895,368, filed Sep. 3, 2019, which are incorporated by reference herein in their entireties.

TECHNICAL FIELD

The present disclosure generally relates to computer vision systems, and in particular to increasing robustness of computer vision systems to variations in images.

BACKGROUND

Computer vision systems often seek to identify visual features (e.g., presence of objects, type of objects, pose of objects, etc.) within images using trained machine learning modules. To train machine learning modules, computer vision subsystems modify parameters of the machine learning modules using training data. Developers of computer vision systems continue to face challenges with training efficiency and accuracy thereof.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
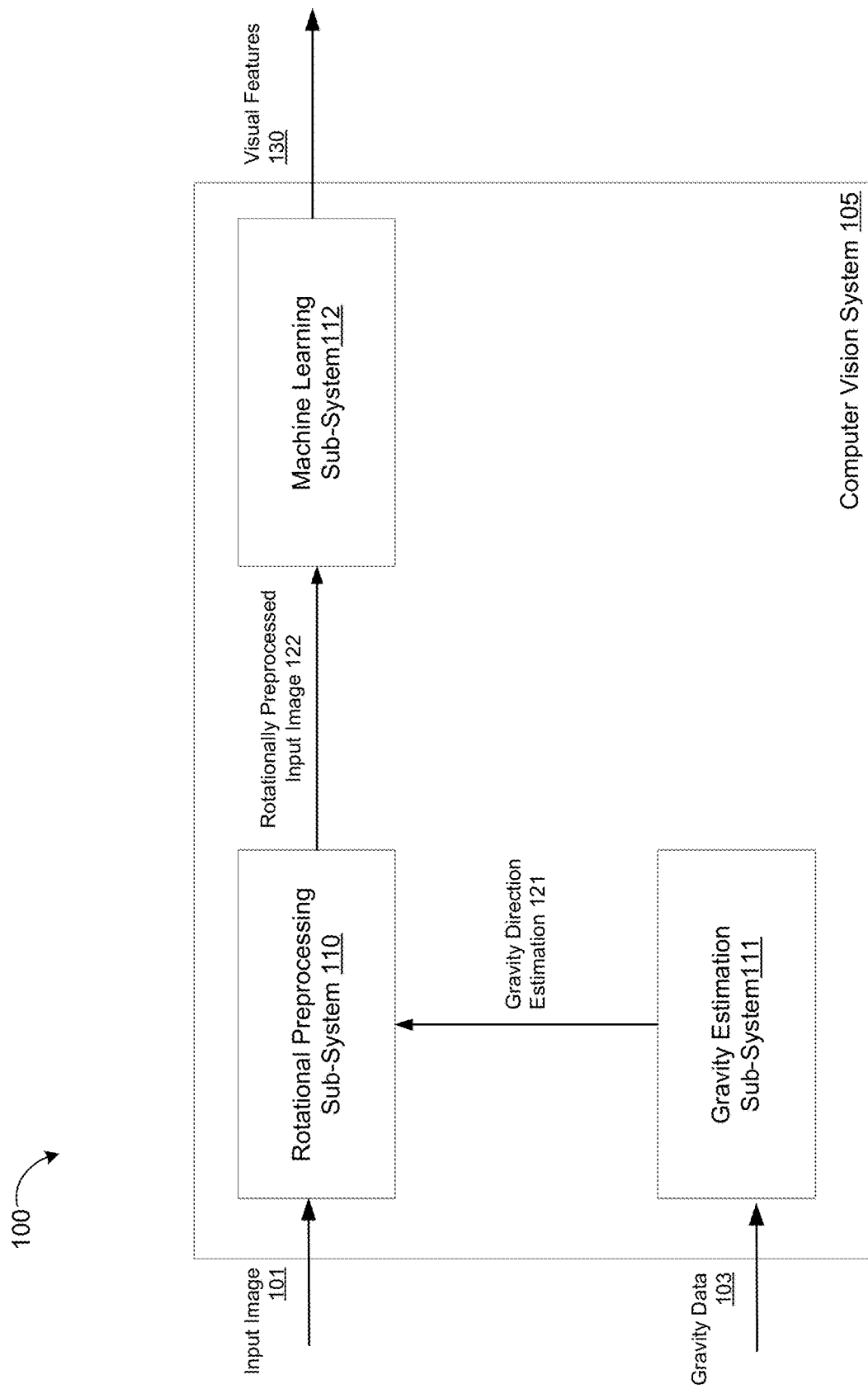
FIG. 1 is a block diagram of an example image processing environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for increasing robustness of computer vision systems to rotational variation in images. According to some implementations, the method is performed at a device with one or more processors, non-transitory memory, and a machine learning sub-system. The method includes: obtaining an input image, wherein the input image is captured by an image sensor having a rotational orientation with respect to a direction of gravity; obtaining a gravity direction estimation associated with the rotational orientation of the sensor; generating, from the input image, a rotationally preprocessed input image by applying one or more transformations to the input image based on the gravity direction estimation; providing the rotationally preprocessed input image to the machine learning sub-system; and identifying, using the machine learning sub-system, a visual feature within the rotationally preprocessed input image.

Various implementations disclosed herein include devices, systems, and methods for increasing robustness of computer vision systems to rotational variation in images. According to some implementations, the method is performed at a device with one or more processors, non-transitory memory, and a machine learning sub-system. The method includes: generating a per-pixel gain map for an input image based on a gravity direction estimation, wherein a gain value for each pixel within the input image corresponds to its direction relative to the gravity direction estimation; generating one or more steered kernels based on the per-pixel gain map and one or more basis filters; modifying operating parameters for at least a subset of the plurality of layers of the machine learning sub-system to include the one or more steered kernels; and identifying, using the modified machine learning sub-system, visual features within the input image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Some existing computer vision systems use trained machine learning sub-systems to process input images and solve computer vision problems (e.g., object recognition, object detection, and pose estimation problems) based on those input images. Machine learning sub-systems are more difficult to train, demand more computational resources, and are less accurate when the input images have arbitrary rotational variances. For example, a machine learning sub-system is more prone to errors when attempting to recognize a particular shared feature (e.g., the presence of a particular object) in multiple input images if the rotational orientation of the particular shared feature varies across the multiple input images. Various implementations of the present invention improve the training efficiency and/or accuracy of a computer vision system by rotationally preprocessing images provided to a machine learning sub-system based on a measure of the direction of gravity in the environment associated with the images. Various implementations of the present invention improve the training efficiency and/or accuracy of a computer vision system by steering kernels (i.e., filters) of the convolutional layers of a CNN based on a gravity direction estimation in order to produce a response that is substantially invariant to rotation.

FIG. 1 is a block diagram of an example image processing environment 100 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the image processing environment 100 includes a computer vision system 105 with a rotational preprocessing sub-system 110, a gravity estimation sub-system 111, and a machine learning sub-system 112.

In some implementations, the rotational preprocessing sub-system 110 is configured to process an input image 101 based on a gravity direction estimation 121 in order to generate a rotationally preprocessed input image 122.

In some implementations, the rotational preprocessing sub-system 110 generates the rotationally preprocessed input image 122 by applying one or more transformations to the input image 101 based on the gravity direction estimation 121. In some implementations, applying the one or more transformations to the input image 101 based on the gravity direction estimation 121 includes modifying the input image 101 so that at least one line in the input image 101 has a predefined slope relative to the gravity direction estimation 121 (e.g., a slope that is substantially parallel to or substantially perpendicular to the gravity direction estimation 121). In some implementations, the rotationally preprocessed input image 101 is a feature map of at least a portion of the input image 101.

In some implementations, the gravity estimation sub-system 111 is configured to generate the gravity direction estimation 121. In some implementations, the gravity estimation sub-system 111 determines the gravity direction estimation 121 by processing gravity data 103 from an inertial measurement unit (IMU). In some implementations, the gravity estimation sub-system 111 determines the gravity direction estimation 121 by identifying one or more lines in the input image that correspond to real-world vertical lines (e.g., using vanishing point estimation).

In some implementations, the machine learning sub-system 112 (e.g., a neural network such as a convolutional neural network (CNN)) is configured to process the rotationally preprocessed input image 122 to generate one or more visual features 130 in the input image 101.

In some implementations, the one or more visual features 130 associated with the input image 101 include a detection of presence of an object associated with the rotationally preprocessed input image 122. In some implementations, the one or more visual features 130 associated with the input image 101 include a detection of a type of an object associated with the rotationally preprocessed input image 122. In some implementations, the one or more visual features 130 associated with the input image 101 include an estimation of pose of an object associated with the rotationally preprocessed input image 122.

Although the rotational preprocessing sub-system 110, the gravity estimation sub-system 111, and the machine learning sub-system 112 are shown as residing on a single device (e.g., the computer vision system 105), it should be understood that in other implementations, any combination of the rotational preprocessing sub-system 110, the gravity estimation sub-system 111, and the machine learning sub-system 112 may be located in separate computing devices.

Moreover, FIG. 1 is intended more as functional description of the various features which be present in a particular implementations as opposed to a structural schematic of the implementation described herein. As recognized by those of ordinary skill in the art, items shown separately could be combined and some items could be separated. For example, some functional modules shown separately in FIG. 1 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 2:
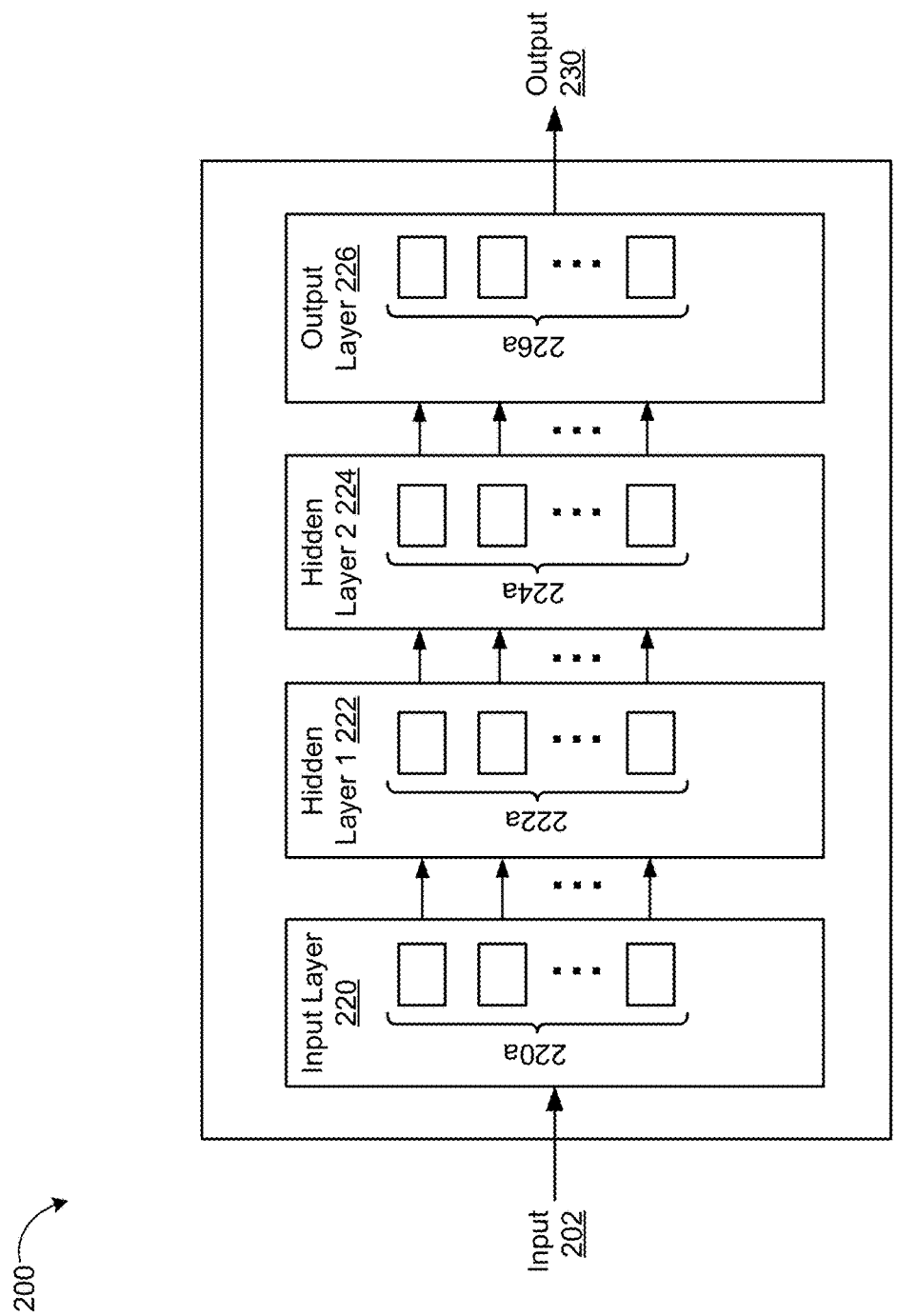
FIG. 2 is a block diagram of an example neural network in accordance with some implementations.

FIG. 2 is a block diagram of an example neural network 200 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 200 includes an input layer 220, a first hidden layer 222, a second hidden layer 224, and an output layer 226. While the neural network 220 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 220 is coupled (e.g., configured) to receive various inputs (e.g., image data). For example, the input layer 220 receives pixel data from one or more image sensors. In various implementations, the input layer 220 includes a number of long short-term memory (LSTM) logic units 220a, which are also referred to as model(s) of neurons by those of ordinary skill in the art. In some such implementations, an input matrix from the features to the LSTM logic units 220a include rectangular matrices. For example, the size of this matrix is a function of the number of features included in the feature stream.

In some implementations, the first hidden layer 222 includes a number of LSTM logic units 222a. Those of ordinary skill in the art will appreciate that, in such implementations, the number of LSTM logic units per layer is orders of magnitude smaller than previously known approaches, which allows such implementations to be embedded in highly resource-constrained devices. As illustrated in the example of FIG. 2, the first hidden layer 222 receives its inputs from the input layer 220.

In some implementations, the second hidden layer 224 includes a number of LSTM logic units 224a. In some implementations, the number of LSTM logic units 224a is the same as or similar to the number of LSTM logic units 220a in the input layer 220 or the number of LSTM logic units 222a in the first hidden layer 222. As illustrated in the example of FIG. 2, the second hidden layer 224 receives its inputs from the first hidden layer 222. Additionally and/or alternatively, in some implementations, the second hidden layer 224 receives its inputs from the input layer 220.

In some implementations, the output layer 226 includes a number of LSTM logic units 226a. In some implementations, the number of LSTM logic units 226a is the same as or similar to the number of LSTM logic units 220a in the input layer 220, the number of LSTM logic units 222a in the first hidden layer 222, or the number of LSTM logic units 224a in the second hidden layer 224. In some implementations, the output layer 226 is a task-dependent layer that performs a computer vision related task such as object recognition, object detection, or pose estimation. In some implementations, the output layer 226 includes an implementation of a multinomial logistic function (e.g., a soft-max function) that produces a number of outputs.

Neural networks, such as convolutional neural networks (CNNs), are often used to solve computer vision problems including object recognition, object detection, and pose estimation. The success of neural networks is typically dependent on using a large sample size of input data and designing so-called deep architectures. A modern CNN is typically described as having an input layer, a number of hidden layers, and an output layer. In at least some scenarios, the input to the input layer of the CNN is an image frame while the output layer is a task-dependent layer. The hidden layers often include one of a plurality of operations such as convolutional, nonlinearity, normalization, and pooling operations.

For example, a respective convolutional layer may include a set of filters whose weights are learned directly from data. Continuing with this example, the output of these filters are one or more feature maps that are obtained by applying filters to the input data of the convolutional layer. Each element in a feature map is computed by considering a region in its input data. This region is defined as the receptive field of a CNN feature. Thus, it will be clear to one of ordinary skill in the art that a feature map is dependent on the orientation of the input image frame. For instance, assuming that an image sensor has a specific object within its field-of-view and the image frames from that image sensor are fed into a CNN, the output of the CNN will be based on the feature maps produced by the convolutional layers of the CNN. If the image sensor rotates about its forward-facing axis, the image frames will also rotate and the resultant feature maps will change drastically, which, in turn, affect the output of the CNN. However, it is desirable that a CNN is either invariant or at least robust to these geometric variations, e.g., the CNN should still recognize an object even when a user is holding their mobile phone that includes the image sensor sideways.

On the other hand, it may be desirable for a neural network to be able to recognize the orientation of an object with respect to gravity. Humans have a notion of "up" and "down," and humans frequently use that notion of direction (orientation) in their spatial reasoning. Similarly, a CNN that computes features while considering gravity may be able to distinguish, e.g., whether a human in an image is standing or lying down or doing a handstand, or whether a car has its wheels on the ground or has been turned upside down.

Classifying these properties within an image frame accurately is very difficult, even for humans, without knowing the gravity direction or, in other words, without knowing where "up" and "down" are in the image frame. This has in fact been exploited to generate the illusion of people achieving unrealistic feats such as walking up a wall. The illusion works because the viewer of such an image does not have a way to know the direction of gravity. If the viewer knew the direction of gravity, the viewer could immediately tell that the person is actually not walking up a wall but standing on the ground.

At least some of the implementations discussed herein do not use input image frame directly but, instead, rectify the input image frames by, e.g., applying a rectifying homography based on gravity measurements. This allows the image frames to be warped to a more accurate upright view (e.g., aligning the image plane with gravity direction) or top-down view (e.g., aligning the image plane normal relative to the gravity direction). For example, most modern mobile phones have an inertial measurement unit (IMU) or a visual inertial odometry (VIO) unit that can perform such gravity measurements with sufficient accuracy.

In some implementations, a gravity rectified image frame is used as input to a neural network, and, in turn, feature maps are calculated based on the rectified images. According to some implementations, the rectification can later be undone on the final feature maps before the feature maps are processed further. For example, the un-warped feature maps might be used as input into a fully connected layer. This is important, in some implementations, because fully connected layers often expect a standard image layout (e.g., rectangular) while the image layout of the rectified image frame may not follow the standard image layout. By undoing the warping before feeding the feature maps to the fully connected layer this layout handling problem can be circumvented. In some implementations, a first set of convolutional filters within the neural network are warped in order to perform gravity rectification.

Figure 3:
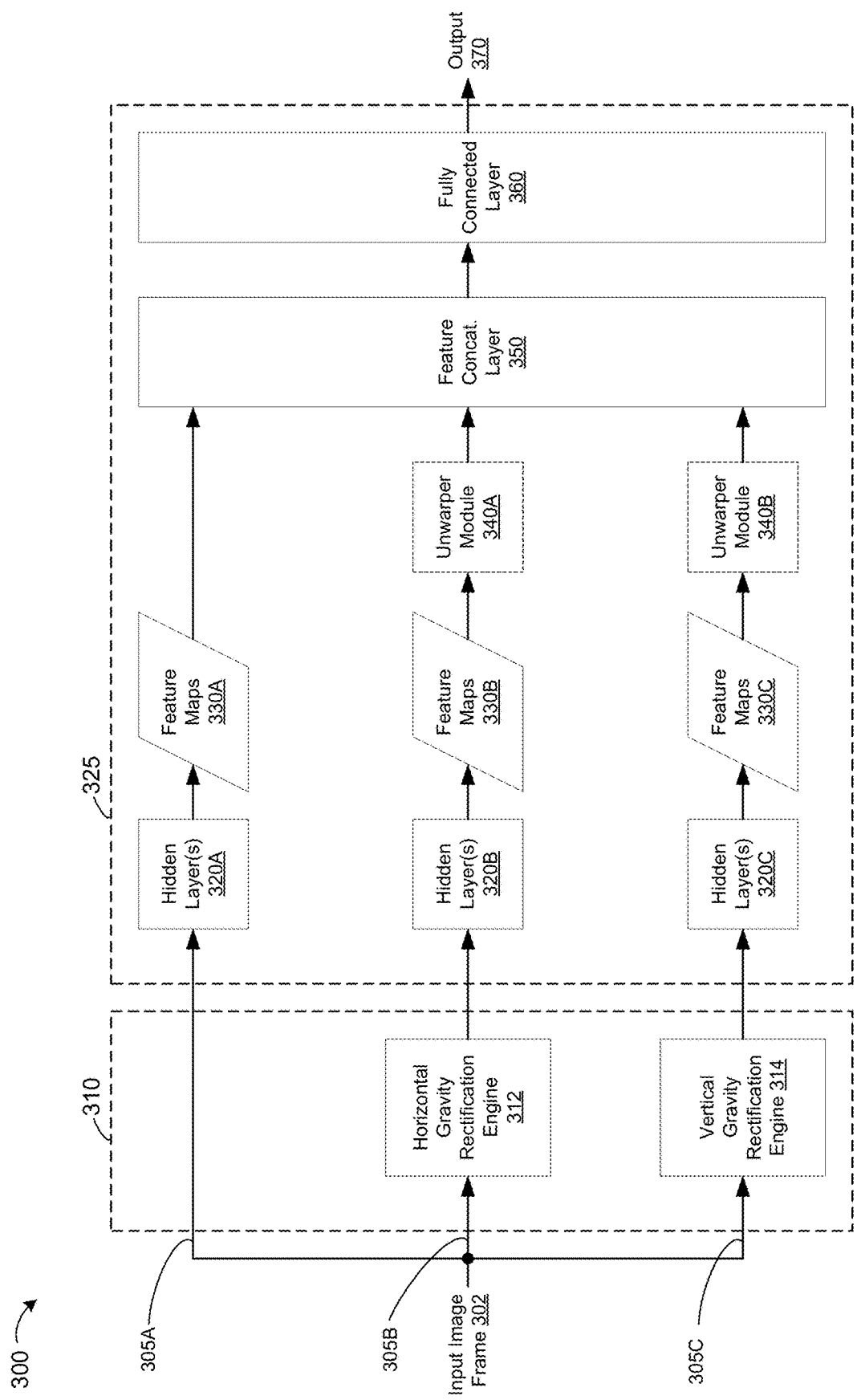
FIG. 3 is a block diagram of another example image processing environment in accordance with some implementations.

FIG. 3 is a block diagram of another example image processing environment 300 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the image processing environment 300 includes a preprocessing sub-system 310 and a neural network sub-system 325. Moreover, the image processing environment 300 includes three image processing paths: a non-gravity rectified path 305A, a first gravity rectified path 305B, and a second gravity rectified path 305C. While the image processing environment 300 includes three image processing paths as an example, those of ordinary skill in the art will appreciate from the present disclosure that these may be replaced with a single image processing path (e.g., a gravity rectified path), two image processing paths (e.g., a non-gravity rectified path and a gravity rectified path), or more than three image processing paths (e.g., a non-gravity rectified path, and three or more different gravity rectified paths) in various implementations. According to some implementations, the image processing environment 300 corresponds to the computer vision system 105 in FIGS. 1 and 7.

As shown in FIG. 3, the input image frame 302 is the input for the non-gravity rectified path 305A. With reference to the non-gravity rectified path 305A, the input image frame 302 is fed to the one or more hidden layers 320A (e.g., convolutional layers) of the neural network sub-system 325. For example, the one or more hidden layers 320A are similar to and adapted from the first hidden layer 222 and the second hidden layer 224 in FIG. 2. As such, the one or more hidden layers 320A will not be described again in detail for the sake of brevity. The output from the one or more hidden layers 320A of the neural network sub-system 325 is feature maps 330A, which are fed into a feature concatenation layer 350.

As shown in FIG. 3, the input image frame 302 is also the input for the first gravity rectified path 305B. With reference to the first gravity rectified path 305B, the input image frame 302 is fed to the horizontal gravity rectification engine 312. For example, the horizontal gravity rectification engine 312 aligns the image plane associated with the input image frame 302 normal relative to the gravity direction. In other words, the image plane is aligned orthogonal to the gravity axis. In some implementations, the horizontal gravity rectification engine 312 uses a homographic or cylindrical warping technique.

Thereafter, the output of the horizontal gravity rectification engine 312 (e.g., a horizontal gravity rectified image frame) is fed to the one or more hidden layers 320B (e.g., convolutional layers) of the neural network sub-system 325. For example, the one or more hidden layers 320B are similar to and adapted from the first hidden layer 222 and the second hidden layer 224 in FIG. 2. As such, the one or more hidden layers 320B will not be described again in detail for the sake of brevity.

The output from the one or more hidden layers 320B of the neural network sub-system 325 is feature maps 330B, which are fed into an optional unwarper module 340A. The unwarper module 340A reverses the horizontal gravity rectification of the feature maps 330B. In some implementations, the unwarper module 340A uses a homographic or cylindrical unwarping technique. Thereafter, the output of the unwarper module 340A (e.g., an unwarped version of the feature maps 330B) is fed to the feature concatenation layer 350.

As shown in FIG. 3, the input image frame 302 is also the input for the second gravity rectified path 305C. With reference to the third gravity rectified path 305C, the input image frame 302 is fed to the vertical gravity rectification engine 314. For example, the vertical gravity rectification engine 314 aligns the image plane associated with the input image frame 302 relative to the gravity direction. In other words, the image plane is aligned parallel to the gravity axis. In some implementations, the vertical gravity rectification engine 314 uses a homographic or cylindrical warping technique.

Thereafter, the output of the vertical gravity rectification engine 314 (e.g., a vertical gravity rectified image frame) is fed to the one or more hidden layers 320C (e.g., convolutional layers) of the neural network sub-system 325. For example, the one or more hidden layers 320C are similar to and adapted from the first hidden layer 222 and the second hidden layer 224 in FIG. 2. As such, the one or more hidden layers 320C will not be described again in detail for the sake of brevity.

The output from the one or more hidden layers 320C of the neural network sub-system 325 is feature maps 330C, which are fed into an optional unwarper module 340B. The unwarper module 340B reverses the vertical gravity rectification of the feature maps 330C. In some implementations, the unwarper module 340B uses a homographic or cylindrical unwarping technique. Thereafter, the output of the unwarper module 340B (e.g., an unwarped version of the feature maps 330C) is fed to the feature concatenation layer 350.

As shown in FIG. 3, the feature concatenation layer 350 concatenates the feature maps 330A, the unwarped version of the feature maps 330B, and the unwarped version of the feature maps 330C. Thereafter, the concatenated features generated by the feature concatenation layer 350 are fed to a fully connected layer 360, which generates an output 370.

Those of ordinary skill in the art will appreciate from the present disclosure that the gravity rectification and unwarping operations may be performed between different layers of the neural network sub-system 325 in various implementations.

Figure 4:
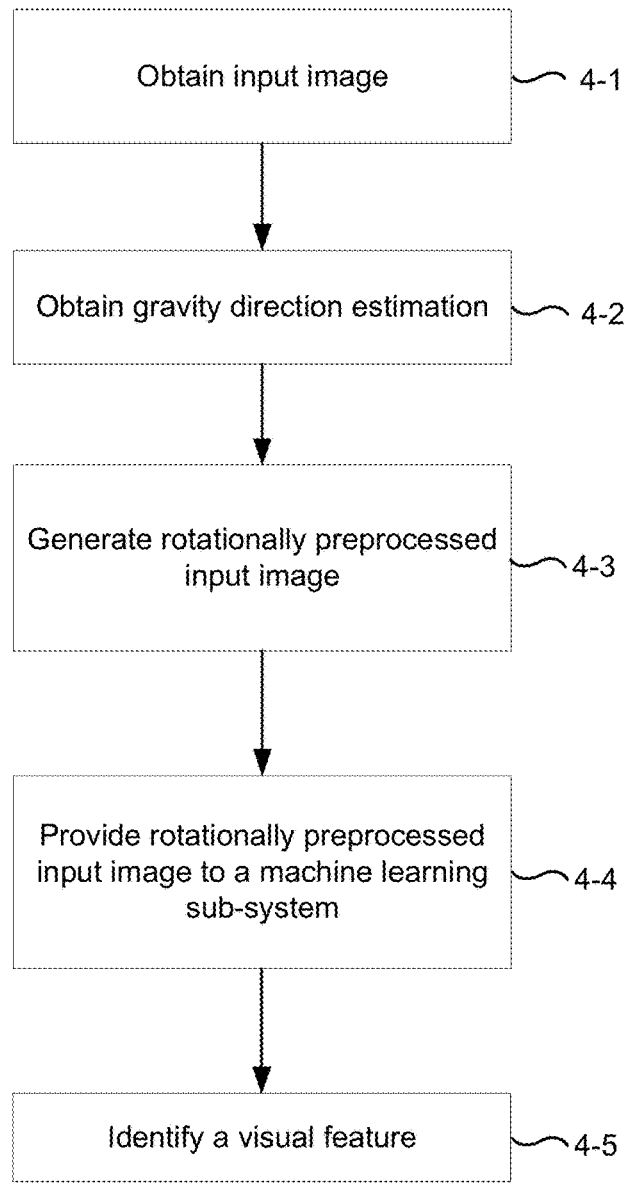
FIG. 4 is a flowchart representation of a method of increasing robustness of computer vision systems to rotational variation in images in accordance with some implementations.

FIG. 4 is a flowchart representation of a method of increasing robustness of computer vision systems to rotational variation in images, in accordance with some implementations. In various implementations, the method 400 is performed by a device with one or more processors and non-transitory memory (e.g., a computing device that includes the computer vision system 105 in FIG. 1 such as the device 700 in FIG. 7). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 4-1, the method 400 includes obtaining an input image. For example, the input image was captured by an image sensor having a rotational orientation with respect to a direction of gravity. For example, device (e.g., the device 700 in FIG. 7) or a component thereof (e.g., the data obtaining system 730) obtains the input image. In some implementations, the device includes the image sensor (e.g., a camera), and the method 400 includes capturing the input image using the image sensor. In some implementations, the device receives or retrieves the image from another device that includes the image sensor (e.g., a camera), and the method 400 includes obtaining the input image from another device. For example, the device corresponds to a cloud server, and the other device corresponds to a mobile phone or digital camera, where images captured by the mobile phone or digital camera are uploaded to the cloud server for processing.

As represented by block 4-2, the method 400 includes obtaining a gravity direction estimation. In some implementations, the gravity estimation is associated with the rotational orientation of the image sensor. For example, device (e.g., the device 700 in FIG. 7) or a component thereof (e.g., the gravity estimation sub-system 111) obtains the gravity direction estimation. In some implementations, obtaining the gravity direction estimation includes determining the gravity direction estimation. For example, the device determines the gravity direction estimation by identifying the one or more lines in the image that correspond to real-world vertical lines by using a vanishing point estimation technique. In another example, the device determines the gravity direction estimation by processing output of an inertial measurement unit (IMU). In yet another example, the device determines the gravity direction estimation by processing output of a visual inertial odometry (VIO) unit.

As represented by block 4-3, the method 400 includes generating, from the input image, a rotationally preprocessed input image. In some implementations, the device generates the rotationally pro-processed input image by applying one or more transformations to the input image based on the gravity direction estimation. For example, the device (e.g., the device 700 in FIG. 7) or a component thereof (e.g., the rotational preprocessing sub-system 110, or the preprocessing sub-system 310 in FIG. 3) generates the rotationally preprocessed input image. In some implementations, the one or more transformations include rotating the input image based on the gravity direction estimation. In some implementations, the one or more transformations include rectifying the input image based on the gravity direction estimation. For example, the device performs a horizontal gravity rectification of the input image by aligning the image plane associated with the input image normal relative to the gravity direction (e.g., using a homographic or cylindrical warping technique). In another example, the device performs a vertical gravity rectification of the input image by aligning the image plane associated with the input image relative to the gravity direction (e.g., using a homographic or cylindrical warping technique).

In some implementations, the one or more transformations include: (i) determining whether a center of gravity is in the input image; (ii) in response to determining that the center of gravity is in the input image, generating a plurality of rotational variants of the input image wherein each rotational variant corresponds to a sub-portion of the input image in which rotational orientation of the sub-portion reflects a real-world rotational orientation of the sub-portion with respect to the direction of gravity; and (iii) for each sub-portion of the input image, estimating one or more properties of the sub-portion based on the rotational variant of the plurality of rotational variants that corresponds to the respective sub-portion.

As represented by block 4-4, the method 400 includes providing the rotationally preprocessed input image to a machine learning sub-system. For example, as shown in FIG. 1, the rotationally preprocessed input image 122 is provided to the machine learning sub-system 112 by the rotational preprocessing sub-system 110. In some implementations, convolutional filters of the machine learning sub-system are warped or rectified in order to perform gravity rectification. In this example, the input image is not rotationally preprocessed.

As represented by block 4-5, the method 400 includes identifying a visual feature within the input image based on the rotationally preprocessed input image. In some implementations, the device (e.g., the device 700 in FIG. 7) or a component thereof (e.g., the machine learning sub-system 112 in FIGS. 1 and 7, or the neural network sub-system 325 in FIG. 3) identifies the visual feature within the input image based on the rotationally preprocessed input image.

In some implementations, the machine learning sub-system is any combination of one or more machine learning modules. Machine learning modules include any module configured to process an input in accordance with one or more parameters to generate an output, where the value of at least one of the one or more parameters is determined using one or more training algorithms (e.g., gradient descent algorithm, backpropagation algorithm, etc.). Examples of machine learning modules include modules that utilize one or more of at least one neural network, at least one regression routine, at least one support vector machine, at least one decision tree, at least one perceptron, etc.

Figure 5B:
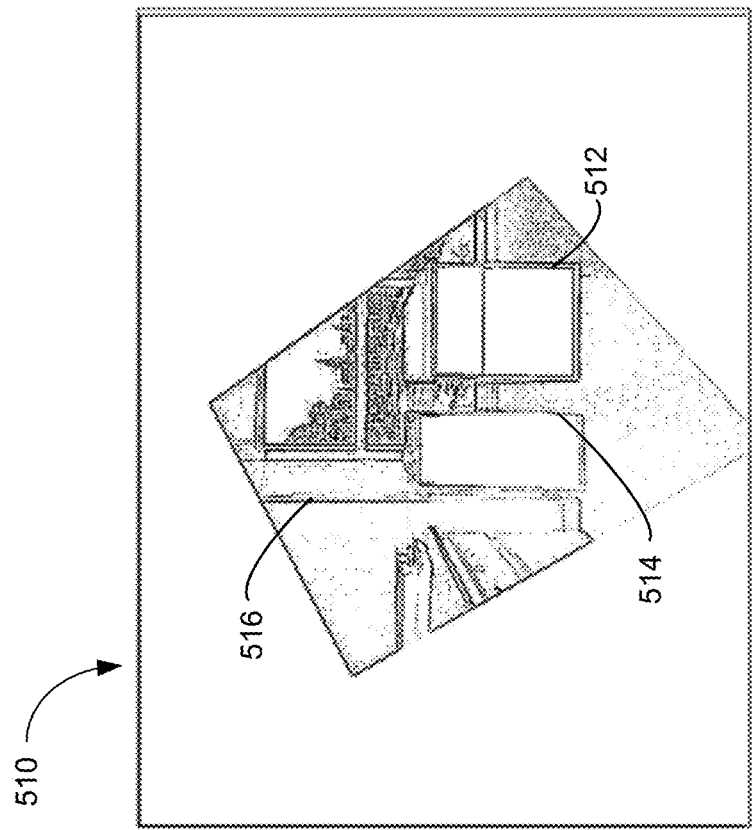
FIGS. 5A-5B illustrate operational examples of correcting for rotational variation in images in accordance with some implementations.
Figure 5A:
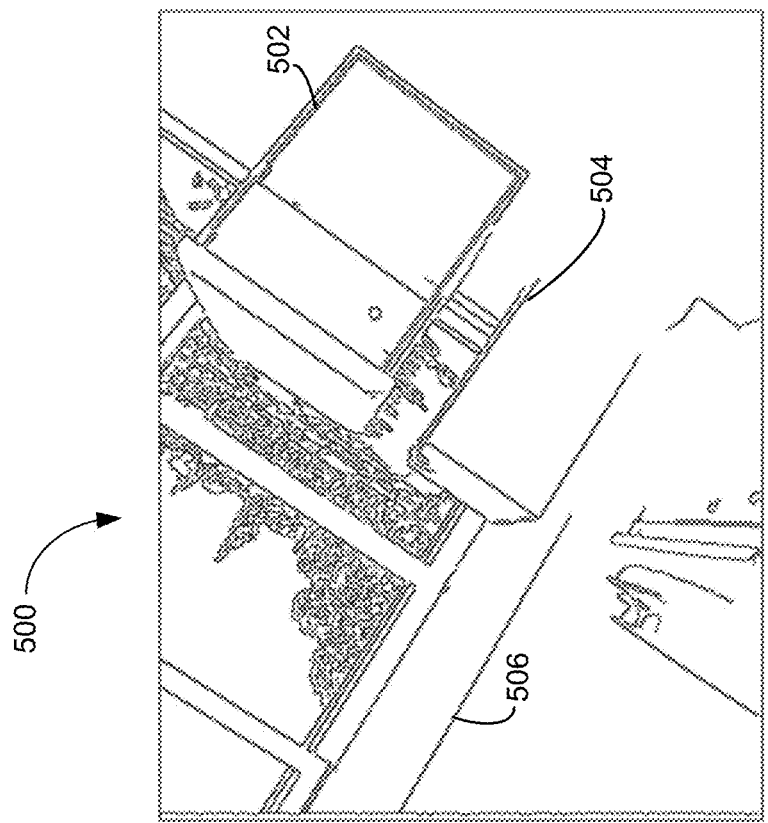

FIGS. 5A-5B illustrate example operational examples of correcting for rotational variation in images, in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as anon-limiting example, FIG. 5A illustrates an operational example 500 of an image before homographic rectification, while FIG. 5B illustrates an operational example 510 of an image after homographic rectification.

In the operational example 500 depicted in FIG. 5A, the image depicts a real-world environment and includes multiple lines (e.g., lines 502, 504, and 506) that correspond to lines in the real-world environment whose direction is parallel to the direction of gravity. However, because the orientation of the picture is at angle with the direction of gravity, lines 502, 504, and 506 appear as tilted lines in the operational example 500.

In the operational example 510 depicted in FIG. 5B, the image depicts the same real-world environment and includes lines 512, 514, and 516 that correspond to the same real-world lines as those depicted by lines 502, 504, and 506 respectively. However, because of homographic rectification, lines 512, 514, and 516 appear as straight lines in the operational example 510.

Figure 6:
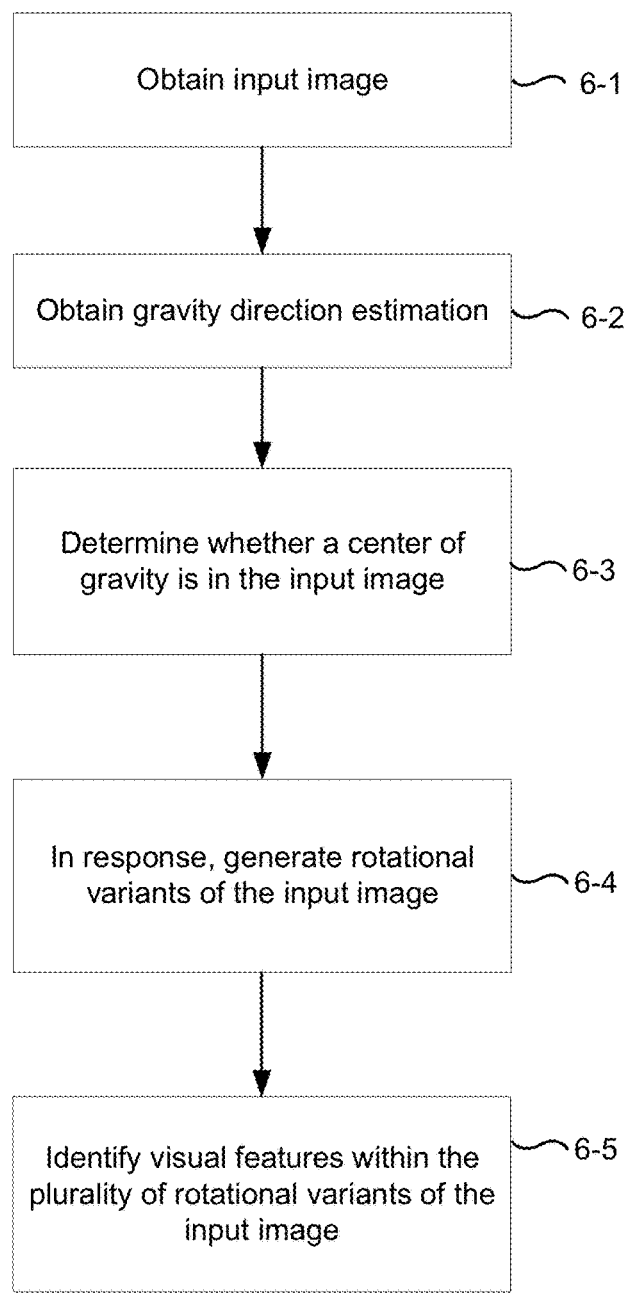
FIG. 6 is a flowchart representation of a method of correcting for rotational variation in images in accordance with some implementations.

FIG. 6 is a flowchart representation of a method of correcting for rotational variation in images, in accordance with some implementations. In various implementations, the method 400 is performed by a device with one or more processors and non-transitory memory (e.g., a computing device that includes the computer vision system 105 in FIG. 1 such as the device 700 in FIG. 7). In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 6-1, the method 600 includes obtaining an input image. In some implementations, the input image was captured by an image sensor having a rotational orientation with respect to a direction of gravity. For example, device (e.g., the device 700 in FIG. 7) or a component thereof (e.g., the data obtaining system 730) obtains the input image. In some implementations, the device includes the image sensor (e.g., a camera), and the method 600 includes capturing the input image using the image sensor. In some implementations, the device receives or retrieves the image from another device that includes the image sensor (e.g., a camera), and the method 600 includes obtaining the input image from another device. For example, the device corresponds to a cloud server, and the other device corresponds to a mobile phone or digital camera, where images captured by the mobile phone or digital camera are uploaded to the cloud server for processing.

As represented by block 6-2, the method 600 includes obtaining a gravity direction estimation. In some implementations, the gravity direction estimation is associated with the rotational orientation of the image sensor. For example, device (e.g., the device 700 in FIG. 7) or a component thereof (e.g., the gravity estimation sub-system 111) obtains the gravity direction estimation. In some implementations, obtaining the gravity direction estimation includes determining the gravity direction estimation. For example, the device determines the gravity direction estimation by identifying the one or more lines in the image that correspond to real-world vertical lines by using a vanishing point estimation technique. In another example, the device determines the gravity direction estimation by processing output of an inertial measurement unit (IMU). In yet another example, the device determines the gravity direction estimation by processing output of a visual inertial odometry (VIO) unit.

As represented by block 6-3, the method 600 includes determining whether a center of gravity is in the input image. For example, device (e.g., the device 700 in FIG. 7) or a component thereof (e.g., the gravity estimation sub-system 111) determines whether a center of gravity is included in the input image. For example, the device may determine that a center of gravity is in the input image if the input image corresponds to an elevated view from above, such as a bird's eye view. Examples of input images that include a center of gravity may include aerial images, floor plans, blueprints, maps, or the like.

As represented by block 6-4, the method 600 includes, in response to determining that the center of gravity is in the input image, generating a plurality of rotational variants of the input image. For example, the device (e.g., the device 700 in FIG. 7) or a component thereof (e.g., the rotational preprocessing sub-system 110, or the preprocessing sub-system 310 in FIG. 3) generates a plurality of rotational variants of the input image. In some implementations, each rotational variant corresponds to a sub-portion of the input image in which rotational orientation of the sub-portion reflects a real-world rotational orientation of the sub-portion with respect to the direction of gravity. In some implementations, for each sub-portion of the input image, the device estimates one or more properties of the sub-portion based on the rotational variant of the plurality of rotational variants that corresponds to the respective sub-portion.

In some implementations, the device obtains information defining sub-portions of the input image. In some implementations, the device divides the input image into sub-portions. For example, the device may divide the input image into sub-portions by defining as a sub-portion of the input image a group of pixels of the input that depict real-world objects with substantially similar rotational orientations with respect to a direction of gravity.

As represented by block 6-5, the method 600 includes identifying visual features within the plurality of rotational variants of the input image. In some implementations, the device provides the plurality of rotational variants of the input image to the machine learning sub-system. In In some implementations, the device (e.g., the device 700 in FIG. 7) or a component thereof (e.g., the machine learning sub-system 112 in FIGS. 1 and 7, or the neural network sub-system 325 in FIG. 3) identifies the visual feature within the input image based on the plurality of rotational variants of the input image.

Figure 7:
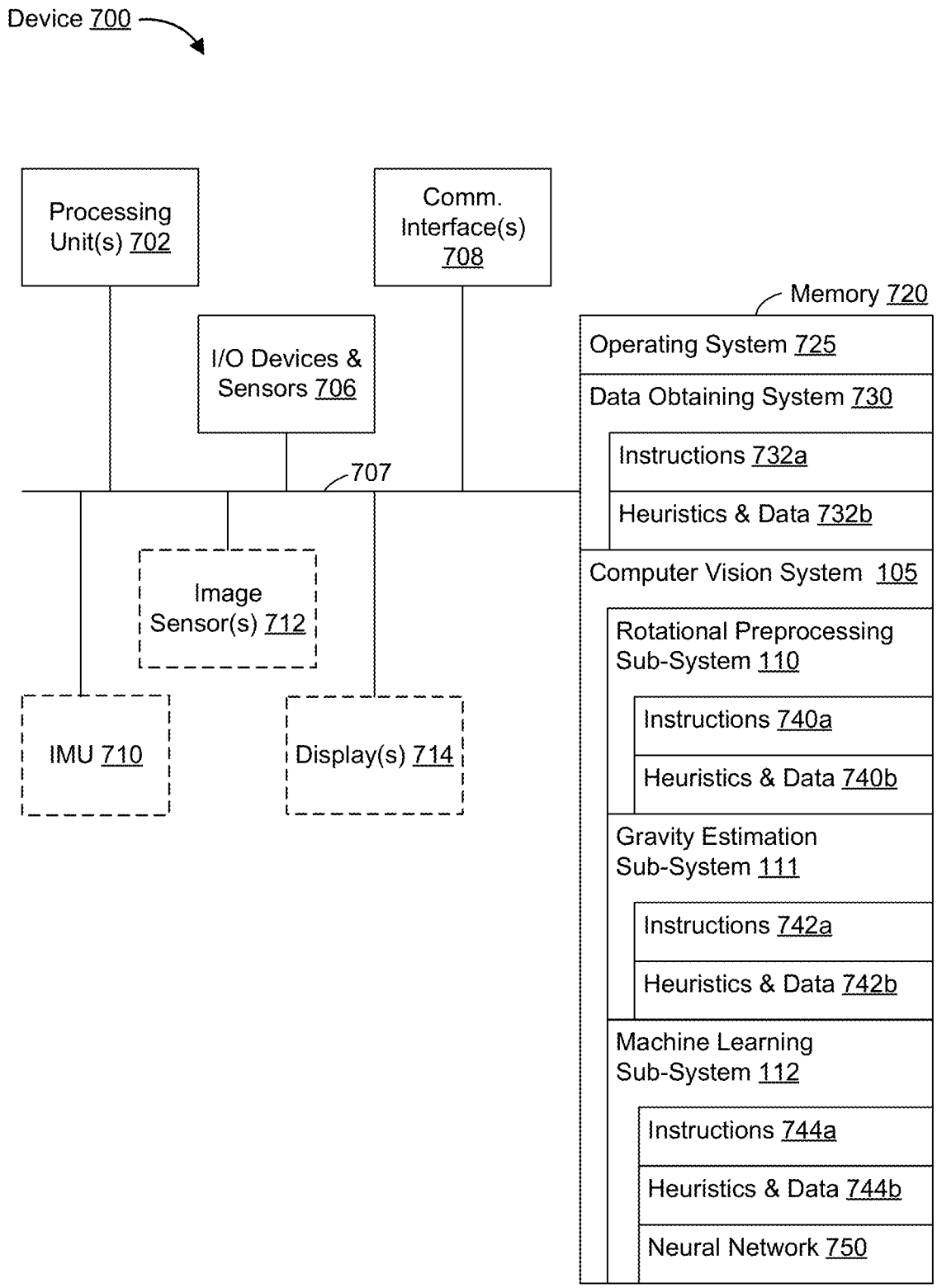
FIG. 7 is a block diagram of an example device in accordance with some implementations.

FIG. 7 is an example block diagram of a device 700 (e.g., a server, mobile phone, tablet, laptop, head-mounted device (HMD), etc.) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 700 includes one or more processing units 702 (e.g., microprocessors, application specific integrated circuits (ASICs), field-programmable gate arrays (FPGAs), graphics processing units (GPUs), central processing units (CPUs), processing cores, and/or the like), one or more input/output (I/O) devices and sensors 706, one or more communication interfaces 708 (e.g., universal serial bus (USB), FIREWIRE, THUNDERBOLT, Institute of Electrical and Electronics Engineers (IEEE) 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interface), an optional inertial measurement unit (IMU) 710, one or more optional interior and/or exterior facing image sensors 712, one or more optional displays 714, a memory 720, and one or more communication buses 707 for interconnecting these and various other components.

In some implementations, the one or more communication buses 707 include circuitry that interconnects and controls communications between system components. In some implementations, the one or more I/O devices and sensors 706 include at least one of an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, a visual inertial odometry (VIO) unit, and/or the like.

In some implementations, the optional IMU 710 is configured to provide gravity data or measurements that indicate a gravity direction of an environment. In some implementations, the one or more optional image sensors 712 are configured to obtain image data. For example, the one or more optional image sensors 712 correspond to one or more RGB cameras (e.g., with a complementary metal-oxide-semiconductor (CMOS) image sensor, or a charge-coupled device (CCD) image sensor), IR image sensors, event-based cameras, and/or the like.

In some implementations, the one or more optional displays 714 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 714 correspond to diffractive, reflective, polarized, holographic, etc. waveguide displays.

The memory 720 includes high-speed random-access memory, such as dynamic random-access memory (DRAM), static random-access memory (SRAM), double-data rate random-access memory (DDR RAM), or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium. In some implementations, the memory 720 or the non-transitory computer readable storage medium of the memory 720 stores the following programs, modules and data structures, or a subset thereof including an optional operating system 725, a data obtaining system 730, and a computer vision system 105. The operating system 725 includes procedures for handling various basic system services and for performing hardware dependent tasks.

In some implementations, the data obtaining system 730 is configured to obtain input image frames (sometimes also herein referred to as "input images," "image data," or simply "images") from a local source (e.g., image frames captured by the one or more image sensors 712 of the device 700) and/or a remote source (e.g., image frames captured by one or more image sensors of a device different from the device 700 such a mobile phone, tablet, HMD, scene camera, or the like). To that end, in various implementations, the data obtaining system 730 includes instructions and/or logic 732a therefor, and heuristics and metadata 732b therefor.

In some implementations, the computer vision system 105 is configured to correct for rotational variation in images. To that end, in various implementations, the computer vision system 105 includes a rotational preprocessing sub-system 110, a gravity estimation sub-system 111, and a machine learning sub-system 112.

In some implementations, the rotational preprocessing sub-system 110 is configured to process an input image based on a gravity direction of an environment (e.g., determined by the gravity estimation sub-system 111). To that end, in various implementations, the rotational preprocessing sub-system 110 includes instructions and/or logic 740a therefor, and heuristics and metadata 740b therefor.

In some implementations, the gravity estimation sub-system 111 is configured to determine a gravity direction of an environment based on gravity data or measurements (e.g., gravity data from the IMU 710). To that end, in various implementations, the gravity estimation sub-system 111 includes instructions and/or logic 742a therefor, and heuristics and metadata 742b therefor.

In some implementations, the machine learning sub-system 112 is configured to process input data and perform a task in order to provide an output. For example, the machine learning sub-system 112 performs object recognition on input images. In some implementations, the machine learning sub-system 112 includes a neural network 750 such as a convolutional neural network (CNN) (e.g., the neural network 200 in FIG. 2, or the neural network sub-system 325 in FIG. 3). To that end, in various implementations, the machine learning sub-system 112 includes instructions and/or logic 744a therefor, and heuristics and metadata 744b therefor.

Although the data obtaining system 730 and the computer vision system 105 are shown as residing on a single device (e.g., the device 700), it should be understood that in other implementations, the data obtaining system 730 and the computer vision system 105 may be located in separate computing devices.

Moreover, FIG. 7 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 8A:
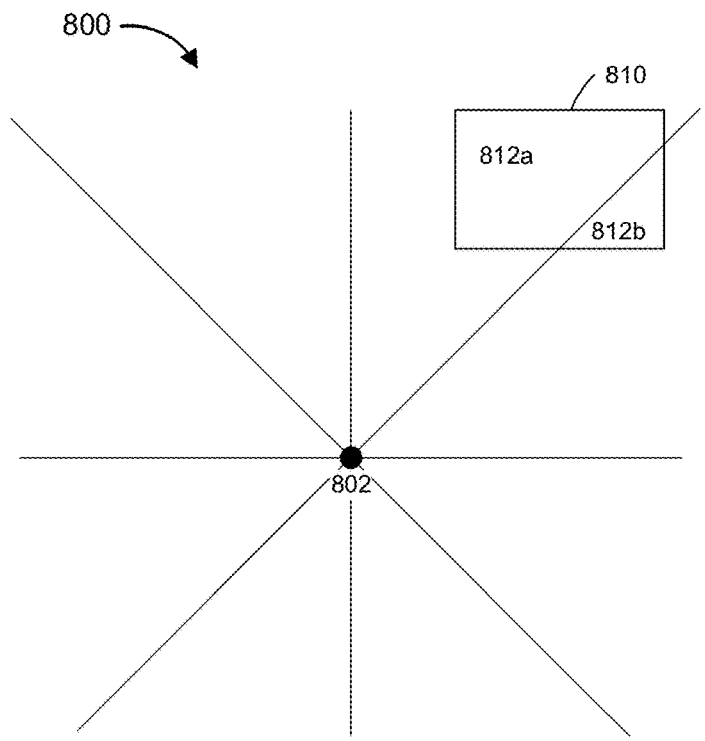
FIGS. 8A-8C illustrate example scenarios whereby an image frame is split into a plurality of image frame pieces in accordance with some implementations.
Figure 8B:
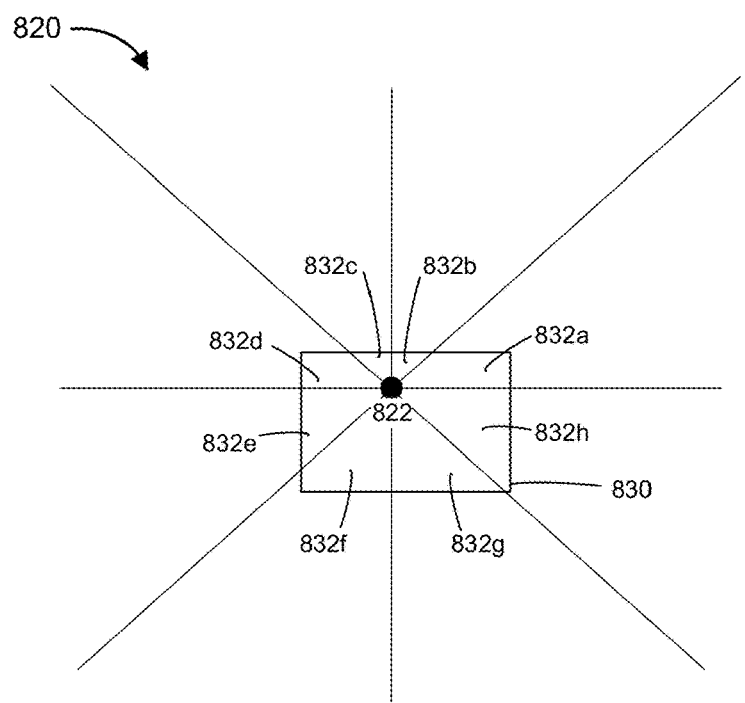
Figure 8C:
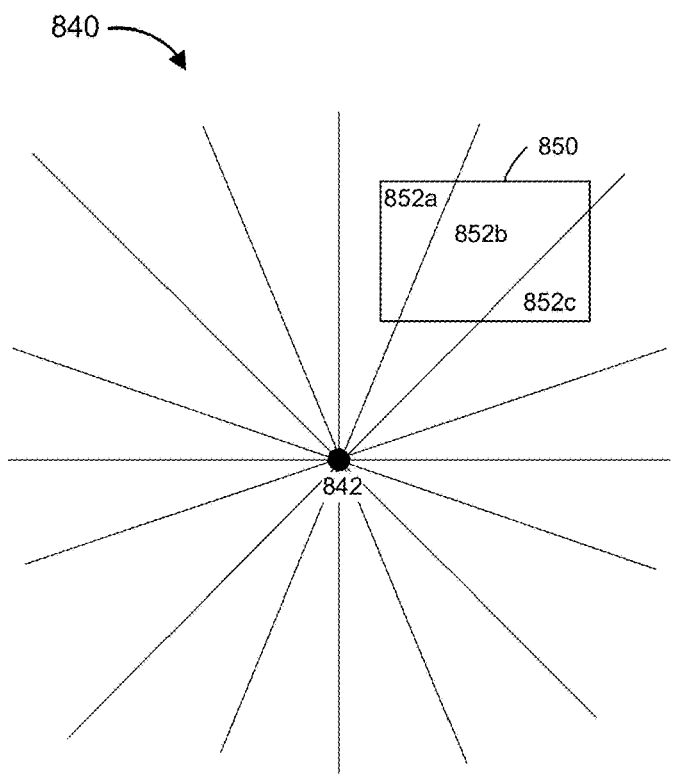

FIGS. 8A-8C illustrate example scenarios whereby an image frame is split into a plurality of image frame pieces, in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

FIG. 8A illustrates a rotation space 800 centered on an origin 802 in accordance with some implementations. In FIG. 8A, for example, the origin 802 corresponds to a position of the direction of gravity (e.g., the floor) relative to an image frame 810. In this example, the position of the direction of gravity is outside of the image frame 810. In FIG. 8A, the rotation space 800 is divided into eight (8) segments at 45° intervals. It will be clear to one of ordinary skill in the art that the rotation space may be divided into an arbitrary number of segments, for example, 4, 8, 16, 32, etc. segments. As shown in FIG. 8A, the image frame 810 is split into two (2) image frame pieces 812a and 812b based on the segmentation of the rotation space 800 and the position of the origin 802 (e.g., the position of the direction of gravity) relative to the image frame 810.

FIG. 8B illustrates a rotation space 820 centered on an origin 822 in accordance with some implementations. In FIG. 8B, for example, the origin 822 corresponds to a position of the direction of gravity relative to an image frame 830. In this example, the position of the direction of gravity is inside of the image frame 830. In FIG. 8B, the rotation space 820 is divided into eight (8) segments at 45° intervals. As shown in FIG. 8B, the image frame 830 is split into eight (8) image frame pieces 832a, 832b, 832c, 832d, 832e, 832f, 832g, and 832h based on the segmentation of the rotation space 820 and the position of the origin 822 (e.g., the position of the direction of gravity) relative to the image frame 830.

FIG. 8C illustrates a rotation space 840 centered on an origin 842 in accordance with some implementations. In FIG. 8C, for example, the origin 842 corresponds to a position of the direction of gravity relative to an image frame 850. In this example, the position of the direction of gravity is outside of the image frame 850. In FIG. 8C, the rotation space 840 is divided into sixteen (16) segments at 22.5° intervals. As shown in FIG. 8C, the image frame 850 is split into three (3) image frame pieces 852a, 852b, and 852c based on the segmentation of the rotation space 840 and the position of the origin 842 (e.g., the position of the direction of gravity) relative to the image frame 850. According to some implementations, the origins 802, 822, and 842 (e.g., the position of the direction of gravity in FIGS. 8A-8C) are determined based on output data from an IMU, VIO unit, or the like. Those of ordinary skill in the art will appreciate from the present disclosure that the position of the direction of gravity may be determined using a variety of techniques based a variety of inputs in various implementations.

Figure 8D:
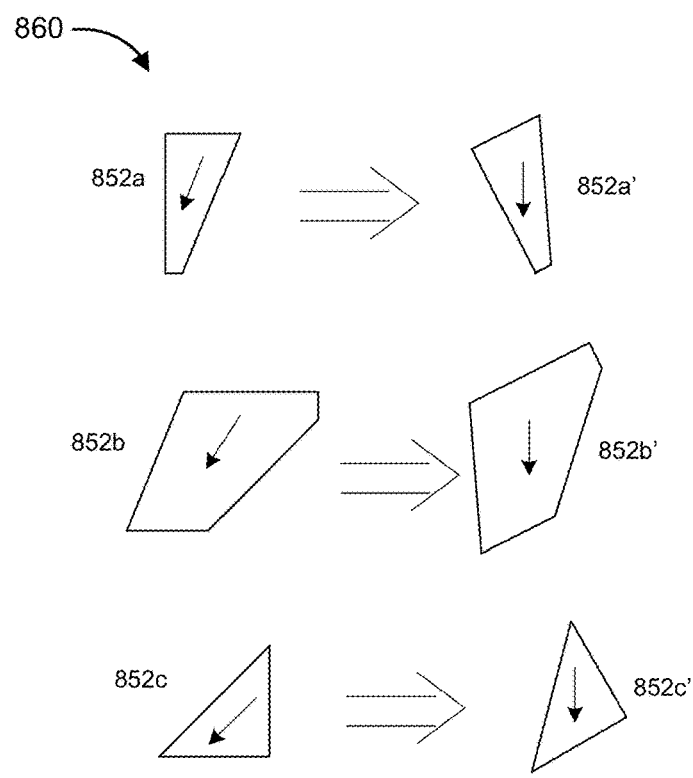
FIG. 8D illustrates a rotation process performed on a plurality of image frame pieces in accordance with some implementations.

FIG. 8D illustrates a rotation process 860 (e.g., gravity rectification) performed on a plurality of image frame pieces in accordance with some implementations. Continuing with the image frame pieces 852a, 852b, and 852c of the image frame 850 from FIG. 8C each of the image frame pieces 852a, 852b, and 852c are rotated (or gravity rectified) based on the location of the origin 842 (e.g., the position of the direction of gravity) relative to each image frame piece, in FIG. 8D. As shown in FIG. 8D, the image frame piece 852a is rotated to produce a rotated image frame piece 852a', the image frame piece 852b is rotated to produce a rotated image frame piece 852b', and the image frame piece 852c is rotated to produce a rotated image frame piece 852c'. As such, the image space associated with the image frame 850 (or the respective image spaces associated with each of the image frame pieces 852a, 852b, and 852c) are rotated to match the rotation space.

Figure 9:
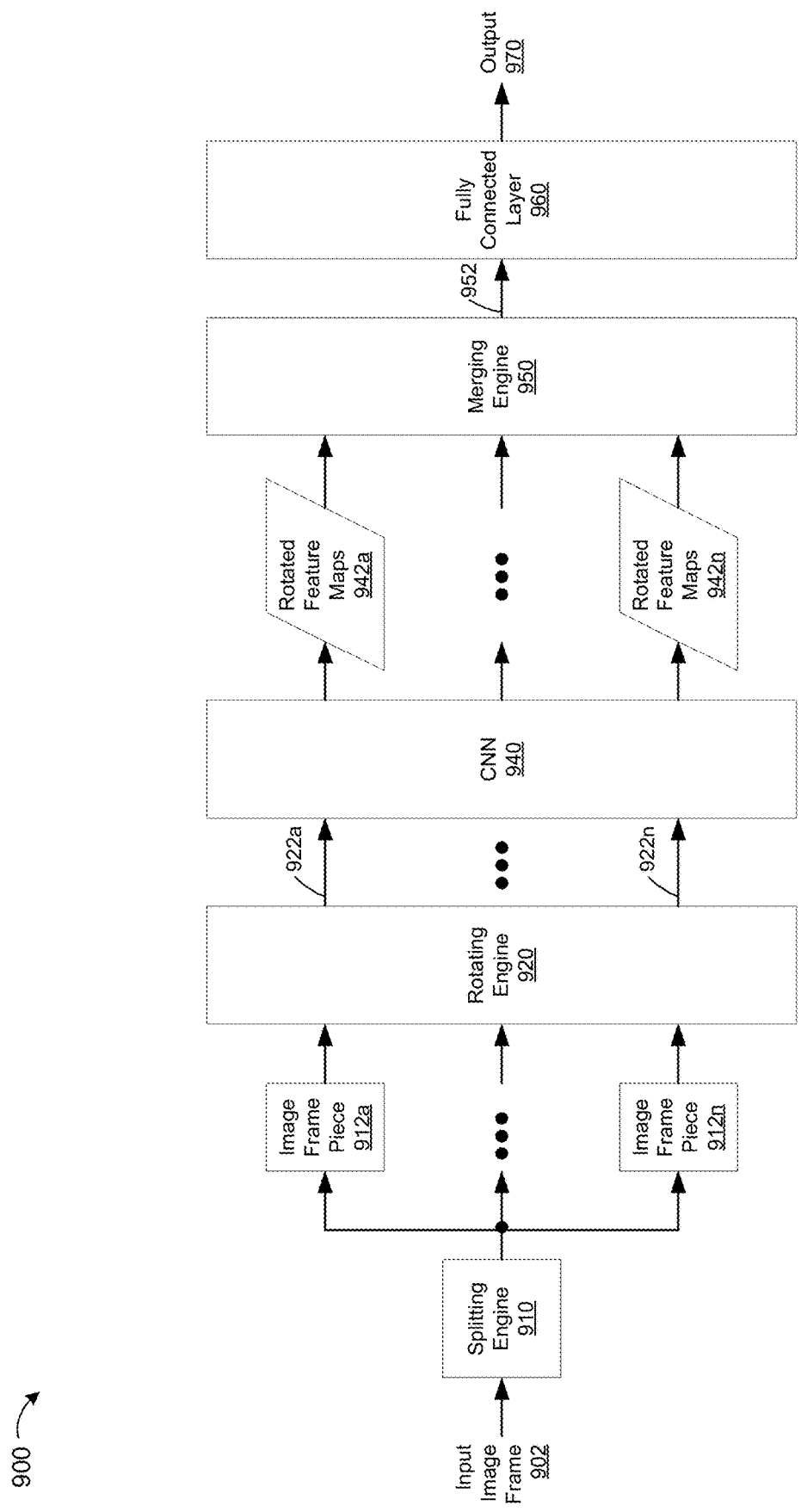
FIG. 9 is a block diagram of yet another example image processing environment in accordance with some implementations.

FIG. 9 is a block diagram of yet another example image processing environment 900 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the image processing environment 900 includes a splitting engine 910 that splits an input image frame 902 into a plurality of image frame pieces 912a, . . . , 912n based on the position of the direction of gravity and the segmentation of the rotation space. As one example, FIG. 8A illustrates splitting an image frame 810 into image frame pieces 812a and 812b based on the segmentation of the rotation space 800 (e.g., eight (8) segments) and the position of the origin 802 relative to the image frame 810. As another example, FIG. 8B illustrates splitting an image frame 830 into image frame pieces 832a, 832b, 832c, 832d, 832e, 832f, 832g, and 832h based on the segmentation of the rotation space 820 (e.g., eight (8) segments) and the position of the origin 822 relative to the image frame 830. As another example, FIG. 8C illustrates splitting an image frame 850 into pieces to image frame pieces 852a, 852b, and 852c based on the segmentation of the rotation space 840 (e.g., sixteen (16) segments) and the position of the origin 842 relative to the image frame 850.

In some implementations, the splitting engine 920 obtains the position of the direction of gravity. In some implementations, the splitting engine 920 determines the position of the direction of gravity based on output data from an IMU, VIO unit, or the like. According to some implementations, the image processing environment 900 corresponds to the computer vision system 105 in FIGS. 1 and 7.

As shown in FIG. 9, the rotating engine 920 rotates the image frame pieces 912a, . . . , 912n based on the location of the position of the direction of gravity relative to each piece to produce rotated image frame pieces 922a, . . . , 922n. As one example, as shown in FIG. 8D, the image frame piece 852a is rotated to produce a rotated image frame piece 852a' based on the location of the origin 842 (e.g., the position of the direction of gravity) relative to the image frame piece 852a. As another example, with reference to FIG. 8D, the image frame piece 852b is rotated to produce a rotated image frame piece 852b' based on the location of the origin 842 (e.g., the position of the direction of gravity) relative to the image frame piece 852b. As yet another example, with reference to FIG. 8D, the image frame piece 852c is rotated to produce a rotated image frame piece 852c' based on the location of the origin 842 (e.g., the position of the direction of gravity) relative to the image frame piece 852c.

As shown in FIG. 9, the rotated image frame pieces 922a, . . . , 922n are fed into the convolutional neural network (CNN) 940, for example, including a plurality of fully convolutional layers with shared weights or the like. Those of ordinary skill in the art will appreciate from the present disclosure that the CNN 940 may perform a variety of operations on the rotated image frame pieces 922a, . . . , 922n, such as convolutional, nonlinearity, normalization, pooling, etc. operations, in various implementations. According to some implementations, the CNN 940 corresponds to the neural network 750 in FIG. 7.

As a result, the CNN 940 produces a plurality of rotated feature maps 942a, . . . , 942n. Thereafter, a merging engine 950 merges the rotated feature maps 942a, . . . , 942n into a complete feature map 952, which is fed to fully connected layer 960. As shown in FIG. 9, the fully connected layer 960 produces an output 970 based on the complete feature map 952.

Figure 10A:
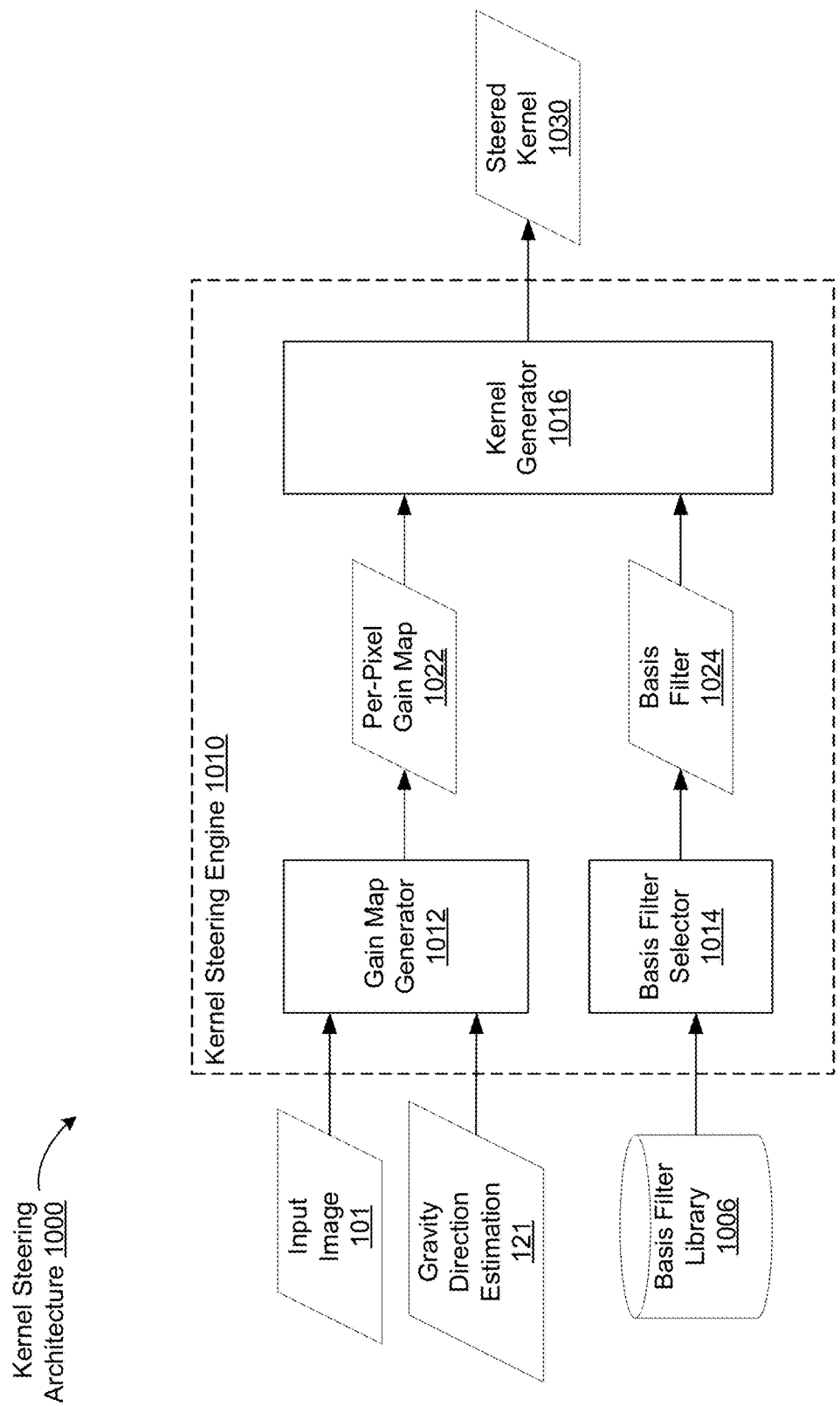
FIG. 10A is a block diagram of a kernel steering architecture in accordance with some implementations.

FIG. 10A is a block diagram of a kernel steering architecture 1000 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the kernel steering architecture 1000 includes a kernel steering engine 1010 that generates a steered kernel 1030 based on an input image 101, a gravity direction estimation 121, and a basis filter library 1006. In some implementations, the kernel steering engine 1010 includes a gain map generator 1012, a basis filter selector 1014, and a kernel generator 1016.

Figure 10B:
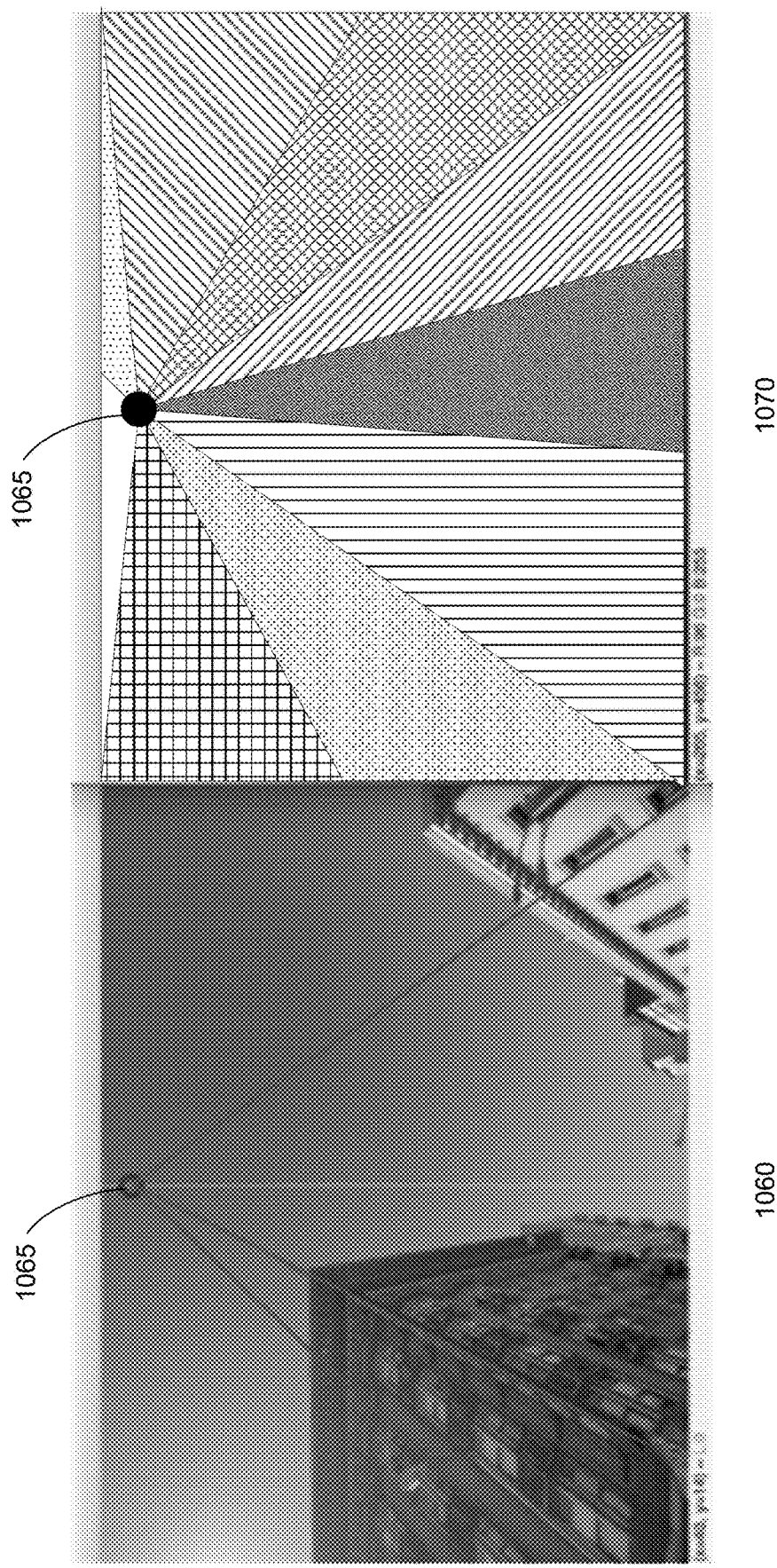
FIG. 10B illustrates an example input image and an associated per-pixel gain map in accordance with some implementations.

As discussed above with reference to FIG. 1, the gravity estimation sub-system 111 obtains (e.g., receives, retrieves, or generates) the gravity direction estimation 121. In some implementations, the gravity estimation sub-system 111 determines the gravity direction estimation 121 by processing gravity data 103 from an inertial measurement unit (IMU) or a visual inertial odometry (VIO) unit. In some implementations, the gravity estimation sub-system 111 determines the gravity direction estimation 121 by identifying one or more lines in the input image 101 that correspond to real-world vertical lines (e.g., using vanishing point estimation). FIG. 10B illustrates an example input image 1060 and a gravity direction estimation 1065 therefor. In this example, the gravity direction estimation 1065 is within the input image 1060. However, one of ordinary skill in the art will appreciate that the gravity direction estimation 1065 may be outside the input image 1060 in various other situations.

In some implementations, the gain map generator 1012 is configured to generate a per-pixel gain map 1022 based on the input image 101 (or a feature map derived therefrom) and the gravity direction estimation 121. In some implementations, the per-pixel gain map 1022 indicates the orientation or angle of each pixel within the input image 101 relative to the gravity direction estimation 121. According to some implementations, the per-pixel gain map 1022 corresponds to a portion of a vector field where each pixel is associated with a point in the vector field and a corresponding vector relative to the gravity direction estimation 121.

FIG. 10B illustrates an example gain map 1070 based on the input image 1060 and the gravity direction estimation 1065 in accordance with some implementations. According to some implementations, a gain map consists of unit-length complex numbers. For example, the map 1070 shows the angle of the vector from a pixel (x,y) to the point of gravity (e.g., the gravity direction estimation 1065) in the input image 1060. For the sake of explanation, the gain map may be referred to as θ(x,y), where the gain map for a frequency f calculated as:

$$e^{if\theta(x,y)} = \cos(f \times \theta(x,y)) + i \times \sin(f \times \theta(x,y)) \quad (1)$$

Hence, the gain map for various example frequencies as shown below:

$$f=0: e^0 = \cos(0) + i \times \sin(0) = 1 \quad (2)$$

$$f=1: e^{i\theta(x,y)} = \cos(\theta(x,y)) + i \times \sin(\theta(x,y)) \quad (3)$$

$$f=2: e^{i2\theta(x,y)} = e^{i\theta(x,y)^2} = \cos(2 \times \theta(x,y)) + i \times \sin(2 \times \theta(x,y)) \quad (4)$$

$$f=3: e^{i3\theta(x,y)} = e^{i\theta(x,y)^3} = \cos(3 \times \theta(x,y)) + i \times \sin(3 \times \theta(x,y)) \quad (5)$$

As such, the game map associated with frequency f is equal to the game map of f=1 raised to the power of f.

Figure 11:
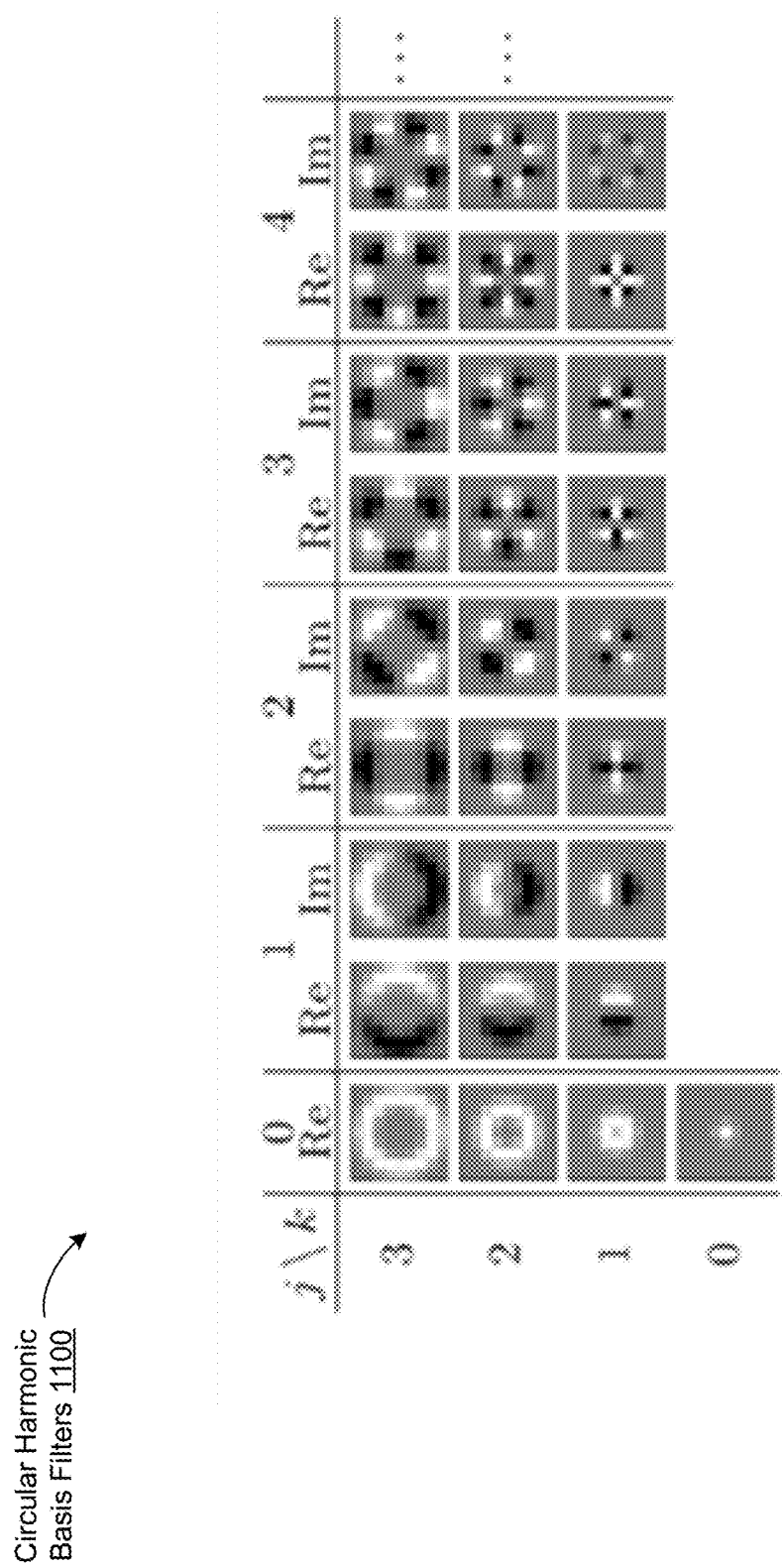
FIG. 11 illustrates example circular harmonic basis filters in accordance with some implementations.

In some implementations, the basis filter selector 1014 is configured to select a basis filter 1024 (or a set of associated basis filters) from the basis filter library 1006. For example, the basis filter library 1006 may include a plurality of different basis filters associated with circular harmonic functions, spherical harmonic functions, and/or the like. FIG. 11 illustrates example circular harmonic basis filters 1100 in accordance with some implementations. The circular harmonic basis filters 1100 may be represented by equation (6) below.

$$\psi_{jk}(r,\varphi) = \tau_j(r) e^{ik\varphi} \quad (6)$$

where (r, φ) correspond to polar coordinates, j corresponds to the radial part, and k∈ℤ is the angular frequency. Gaussian radial parts may be selected for $\tau_j$, where $$\tau_j = \exp\left(-\frac{(r-\mu_j)^2}{2\sigma^2}\right)$$

with $\mu_j = j$. Therefore, $\psi_{jk}(r, \varphi)$ is represented by a sinusoidal angular part $e^{ik\varphi}$ multiplied with a radial function $\tau_j(r)$.

In some implementations, the kernel generator 1016 is configured to generate the steered kernel 1030 (or a set of associated steered kernels) based on the per-pixel gain map 1022 and the basis filter 1024. As such, according to some implementations, the kernel steering engine 1010 generates a steered kernel for each pixel. The operation of the kernel generator 1016 is described in more detail below with respect to FIG. 12.

Figure 12:
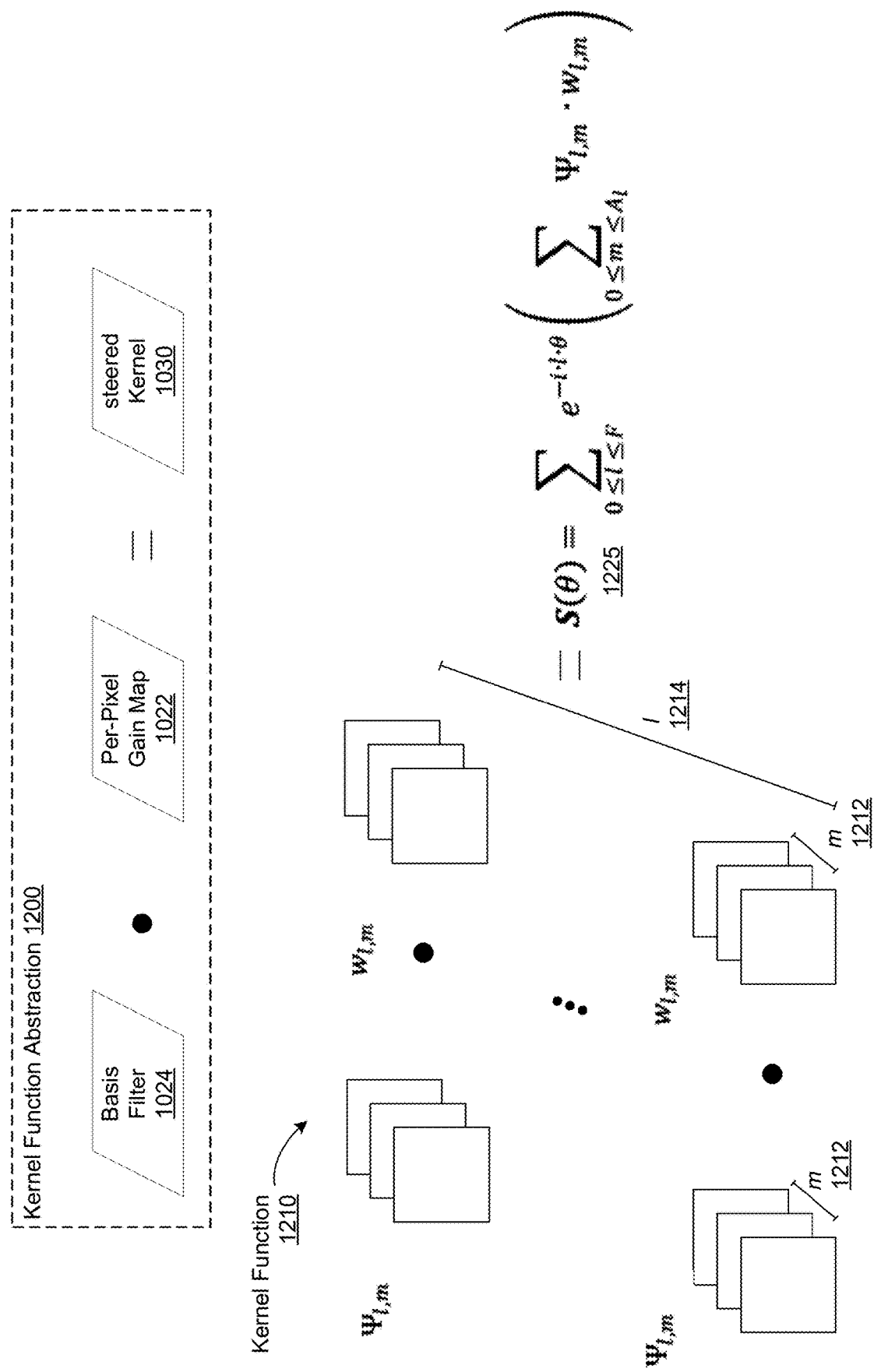
FIG. 12 illustrates a kernel function abstraction and an example kernel function in accordance with some implementations.

FIG. 12 illustrates a kernel function abstraction 1200 and an example kernel function 1210 in accordance with some implementations. The kernel function abstraction 1200 illustrates an abstraction of the operation of the kernel generator 1016, whereby the basis filter 1024 is multiplied by the per-pixel gain map 1022 to generate the steered kernel 1030.

According to some implementations, the kernel generator 1016 generates the steered kernel 1030 according to the kernel function 1210 illustrated in FIG. 12. One of ordinary skill in the art will appreciate how the kernel function 1210 may be constructed differently in various other implementations.

As shown in FIG. 12, the output of the kernel function 1210 corresponds to steerable kernel S(θ) 1225, which is produced according to equation (7) below.

$$S(\theta) = \sum_{0 \le l \le F} e^{-i \cdot l \cdot \theta} \left( \sum_{0 \le m \le A_l} \Psi_{l,m} \cdot w_{l,m} \right) \quad (7)$$

where m 1212 corresponds to the number of basis filters, l 214 corresponds to the number of frequencies sampled to generate S(θ) 1225, $\Psi_{l,m}$ corresponds to a respective basis filter, and $w_{l,m}$ corresponds to the per-pixel gain map.

Figure 13:
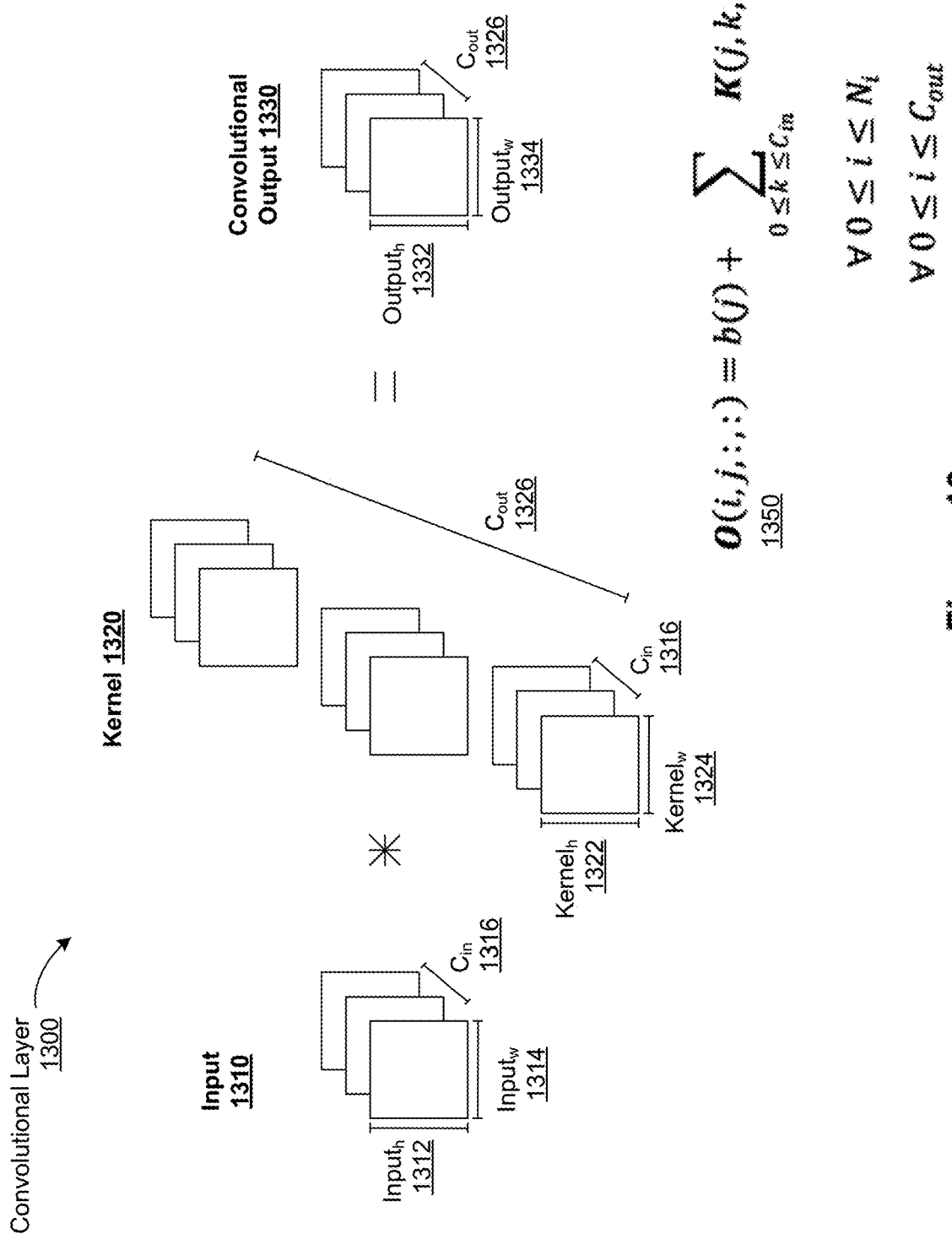
FIG. 13 illustrates a convolutional layer in accordance with some implementations.

FIG. 13 illustrates a convolutional layer 1300 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, a convolutional output 1330 is produced by convolving an input 1310 and a kernel 1320. As shown in FIG. 13, the dimensionality of the input 1310 corresponds to Input$_h$ 1312×Input$_w$ 1314×C$_{in}$ 1316 (number of inputs). As shown in FIG. 13, the dimensionality of the convolutional output 1330 corresponds to Output$_h$ 1332×Output$_w$ 1334×C$_{out}$ 1326 (number of outputs). As shown in FIG. 13, the dimensionality of the kernel 1320 corresponds to Kernel$_h$ 1322×Kernel$_w$ 1324×C$_{in}$ 1316×C$_{out}$ 1326.

According to some implementations, the convolutional output 1330 may be represented by equation (8) (labeled as 1350 in FIG. 13) as follows.

$$O(i, j, :, :) = b(j) + \sum_{0 \le k \le C_{in}} K(j, k, :, :) * I(i, k, :, :) \quad (8)$$

$$\forall \, 0 \le i \le N_i$$

$$\forall \, 0 \le j \le C_{out}$$

In other words, for each batch index i and output channel index j, calculate the convolution of the kernel K(j,k,:,:) and the input image I(i, k,:,:) for the respective input channel k. Sum across all of the input channels k and add the bias b(j), then assign the result O(i,j,:,:) to the output channel j in instance i of the batch. According to some implementations, the kernel K(j,k,:,:) in equation (8) is replaced with the steerable kernel S(θ) 1225 defined in equation (7).

Figure 14:
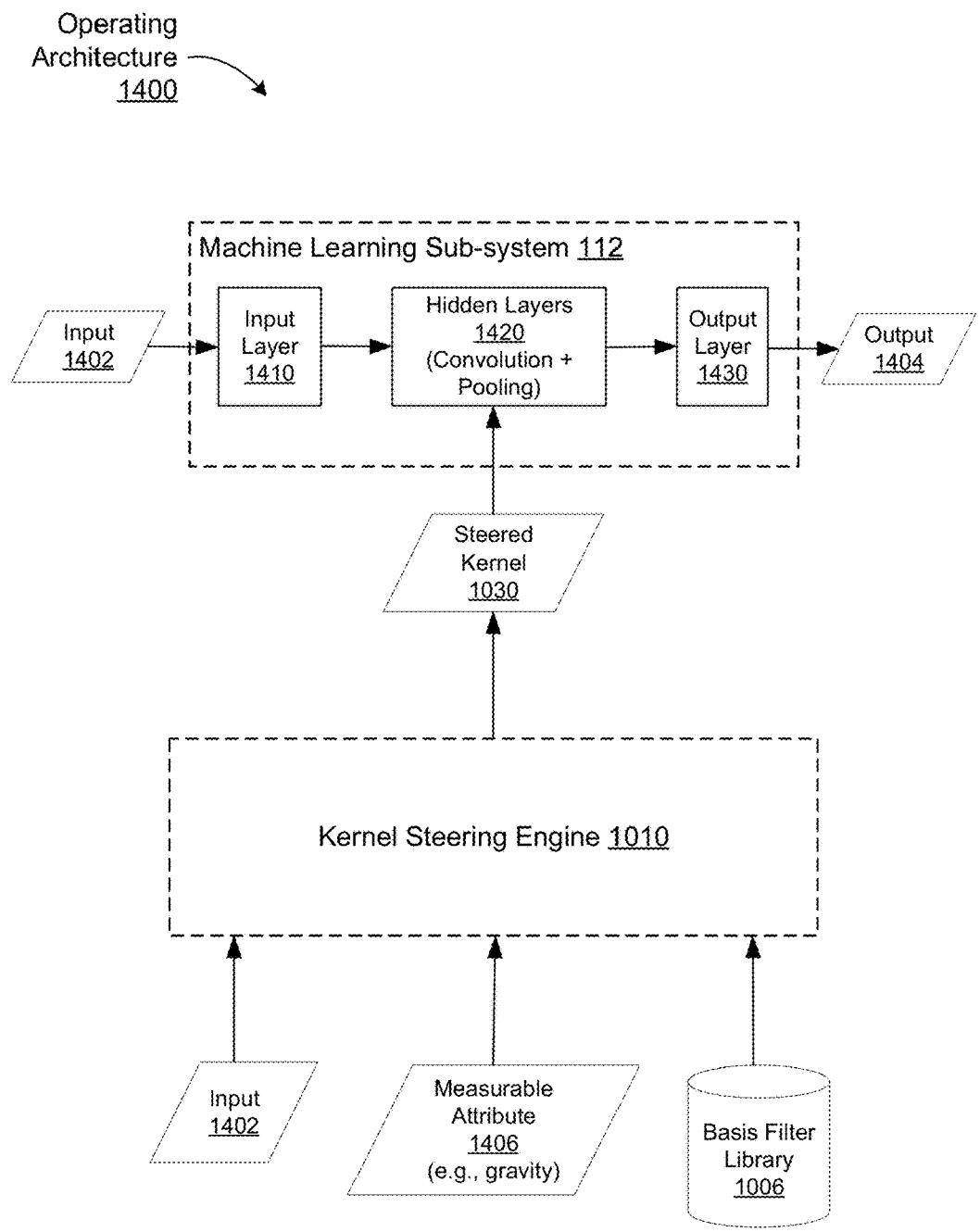
FIG. 14 is a block diagram of an operating architecture in accordance with some implementations.

FIG. 14 is a block diagram of an operating architecture 1400 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the operating architecture 1400 includes the machine learning sub-system 112 and the kernel steering engine 1010.

Similar to the neural network 200 in FIG. 2, according to some implementations, the machine learning sub-system 112 includes an input layer 1410, hidden layers 1420 (e.g., each including one or more convolutional, nonlinearity, normalization, and/or pooling operations), and an output layer 1430. In some implementations, the machine learning sub-system 112 corresponds to a CNN. As shown in FIG. 14, the machine learning sub-system 112 ingests an input 1402 (e.g., the input image 101 in FIGS. 1 and 10A) and produces an output 1404 (e.g., the visual features 130 in FIG. 1).

Similar to FIG. 10A, according to some implementations, the kernel steering engine 1010 generates a steered kernel 1030 (or a set of steered kernels) based on the input 1402 (e.g., the input image 101 in FIGS. 1 and 10A) or a feature map derived therefrom, a measurable attribute 1406 (e.g., the gravity direction estimation 121 in FIGS. 1 and 10A, or some other independently measurable 3D direction), and the basis filter library 1006. In some implementations, the steered kernel 1030 replaces one or more existing kernels used in one or more convolutional layers of the hidden layers 1420 of the machine learning sub-system 112.

Figure 15:
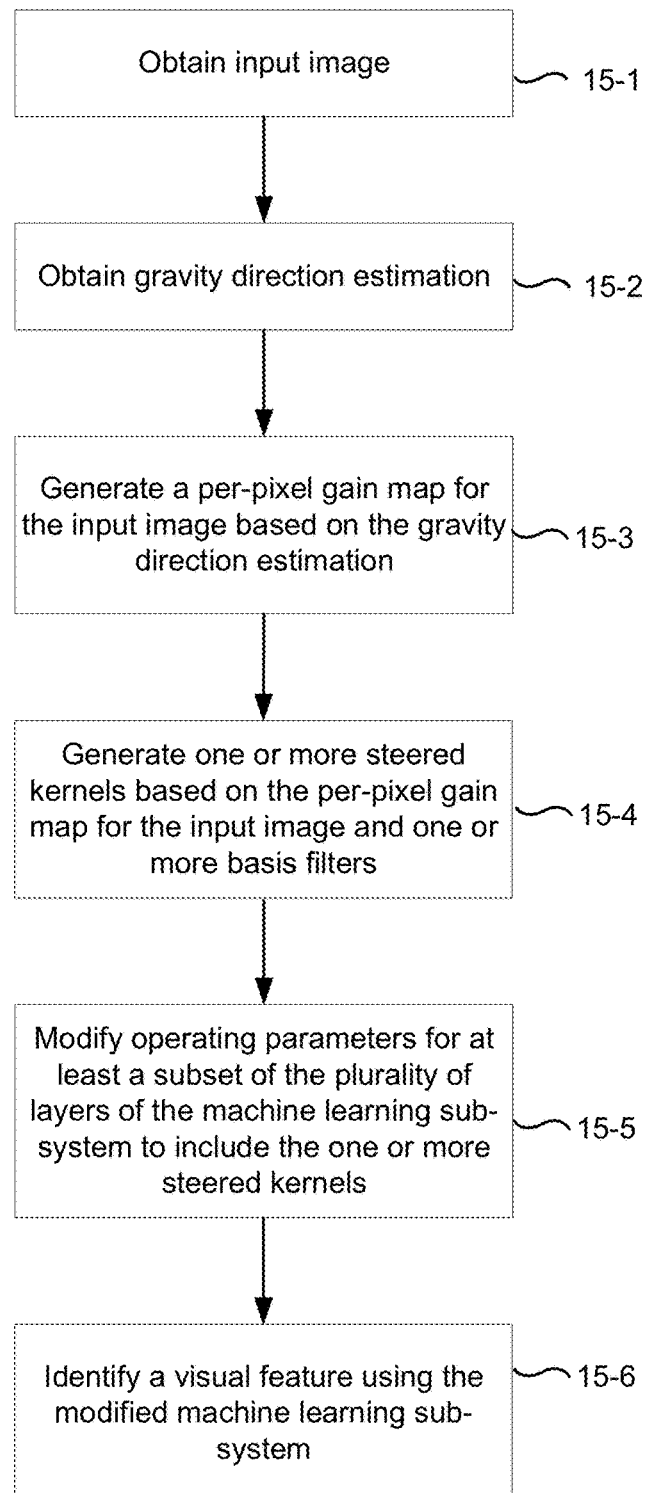
FIG. 15 is a flowchart representation of a method of modifying a machine learning sub-system to include the one or more steered kernels in accordance with some implementations.

FIG. 15 is a flowchart representation of a method of modifying a machine learning sub-system to include the one or more steered kernels in accordance with some implementations. In various implementations, the method 1500 is performed by a device with one or more processors, non-transitory memory, and a machine learning sub-system (e.g., the device 1700 in FIG. 17). In some implementations, the method 1500 is performed by processing logic, including hardware, firmware, software, or a combination thereof. In some implementations, the method 1500 is performed by a processor executing code stored in a non-transitory computer-readable medium (e.g., a memory). In various implementations, some operations in method 1500 are, optionally, combined and/or the order of some operations is, optionally, changed.

Some existing computer vision systems use trained machine learning sub-systems to process input images and solve computer vision problems (e.g., object recognition, object detection, pose estimation problems, etc.) based on those input images. For example, a machine learning sub-system is more prone to errors when attempting to recognize a particular shared feature (e.g., the presence of a particular object) in multiple input images if the rotational orientation of the particular shared feature varies across the multiple input images. As such, in some implementations, the method described herein steers kernels (i.e., filters) of the convolutional layers of a CNN based on a gravity direction estimation in order to produce a response that is substantially invariant to rotation (e.g., as discussed below with reference to FIGS. 16A-16C).

As represented by block 15-1, the method 1500 includes obtaining an input image. In some implementations, the input image was captured by an image sensor having a rotational orientation with respect to a direction of gravity. For example, the device 1700 in FIG. 17 or a component thereof (e.g., the data obtaining system 730) obtains the input image. In some implementations, the device includes the image sensor (e.g., a camera), and the method 1500 includes capturing the input image using the image sensor. In some implementations, the device receives or retrieves the image from another device that includes the image sensor (e.g., a camera), and the method 1500 includes obtaining the input image from another device. For example, the device corresponds to a cloud server, and the other device corresponds to a mobile phone or digital camera, where images captured by the mobile phone or digital camera are uploaded to the cloud server for processing.

As represented by block 15-2, the method 1500 includes obtaining a gravity direction estimation. In some implementations, the gravity direction estimation is associated with the rotational orientation of the image sensor. For example, the device 1700 in FIG. 17 or a component thereof (e.g., the gravity estimation sub-system 111) obtains the gravity direction estimation. In some implementations, obtaining the gravity direction estimation includes determining the gravity direction estimation. For example, the device determines the gravity direction estimation by identifying the one or more lines in the image that correspond to real-world vertical lines by using a vanishing point estimation technique. In another example, the device determines the gravity direction estimation by processing output of an inertial measurement unit (IMU). In yet another example, the device determines the gravity direction estimation by processing output of a visual inertial odometry (VIO) unit. For example, FIG. 10B illustrates an example input image 1060 and a gravity direction estimation 1065 therefor. In this example, the gravity direction estimation 1065 is within the input image 1060. However, one of ordinary skill in the art will appreciate that the gravity direction estimation 1065 may be outside the input image 1060 in various other situations. In some implementations, the gravity direction estimation may be replaced with some other measurable attribute such as an independently measurable 3D direction or other physical phenomena.

As represented by block 15-3, the method 1500 includes generating a per-pixel gain map for the input image based on the gravity direction estimation, wherein a gain value for each pixel within the input image corresponds to its direction relative to the gravity direction estimation. For example, the device 1700 in FIG. 17 or a component thereof (e.g., the gain map generator 1012 in FIGS. 10 and 17) generates the per-pixel gain map for the input image (or a feature map derived therefrom) based on the gravity direction estimation. According to some implementations, the per-pixel gain map may correspond to a portion of a vector field where each pixel is associated with a point in the vector field and a corresponding vector relative to the gravity direction estimation.

As represented by block 15-4, the method 1500 includes generating one or more steered kernels based on the per-pixel gain map and one or more basis filters. For example, the device 1700 in FIG. 17 or a component thereof (e.g., the kernel generator 1016 in FIGS. 10 and 17) generates the one or more steered kernels based on the per-pixel gain map and the one or more basis filters. In some implementations, a set of m×l steered kernels is generated based on a number of basis filters (m) and a number of frequencies (l). For example, FIG. 12 illustrates an example kernel function 1210 in accordance with some implementations.

In some implementations, the one or more basis filters correspond to circular harmonic functions. For example, FIG. 11 illustrates example circular harmonic basis filters 1100 in accordance with some implementations. In some implementations, the one or more basis filters correspond to correspond to spherical harmonic functions. For example, the device 1700 in FIG. 17 or a component thereof (e.g., the basis filter selector 1014 in FIGS. 10 and 17) selects the one or more basis filters from a basis filter library 1006 shown in FIGS. 10 and 17.

As represented by block 15-5, the method 1500 includes modifying operating parameters for at least a subset of the plurality of layers of the machine learning sub-system to include the one or more steered kernels. For example, the device 1700 in FIG. 17 or a component thereof (e.g., the modification unit 1735 in FIG. 17) modifies operating parameters for at least a subset of the plurality of layers of the machine learning sub-system (e.g., the neural network 750) to include the one or more steered kernels. In some implementations, the machine learning sub-system corresponds to a convolutional neural network (CNN). As such, in some implementations, modifying operating parameters for at least a subset of the plurality of layers of the machine learning sub-system includes modifying the kernels for at least some convolutional layers of the CNN to include the one or more steered kernels generated in block 15-4. As such, according to some implementations, the kernel steering engine 1010 generates a steered kernel for each pixel.

For example, FIG. 13 illustrates a convolutional layer 1300 in accordance with some implementations. According to some implementations, as described in FIG. 13, a respective convolutional layer convolves a kernel about the input image or a derivative thereof such as a feature map. For example, as shown in FIG. 13, the input dimensionality corresponds to $Input_h \times Input_w \times C_{in}$ (number of inputs). For example, as shown in FIG. 13, the output dimensionality corresponds to $Output_h \times Output_w \times C_{out}$ (number of outputs). For example, as shown in FIG. 13, the kernel dimensionality corresponds to $Kernel_h \times Kernel_w \times C_{in} \times C_{out}$.

As represented by block 15-6, the method 1500 includes identifying, using the modified machine learning sub-system, a visual feature within the input image. In some implementations, the visual feature corresponds to at least a portion of a real-world object depicted in the input image. For example, the portion of the real-world object corresponds to a line or an edge of an object, a section or component of an object, or the entire object. In some implementations, the visual feature is a value denoting presence or absence of a real-world object in the input image. In some implementations, the visual feature is a pose of a real-world object depicted in the input image. According to some implementations, the method 1500 includes identifying, using the modified machine learning sub-system, one or more visual features within the input image.

Figure 16A:
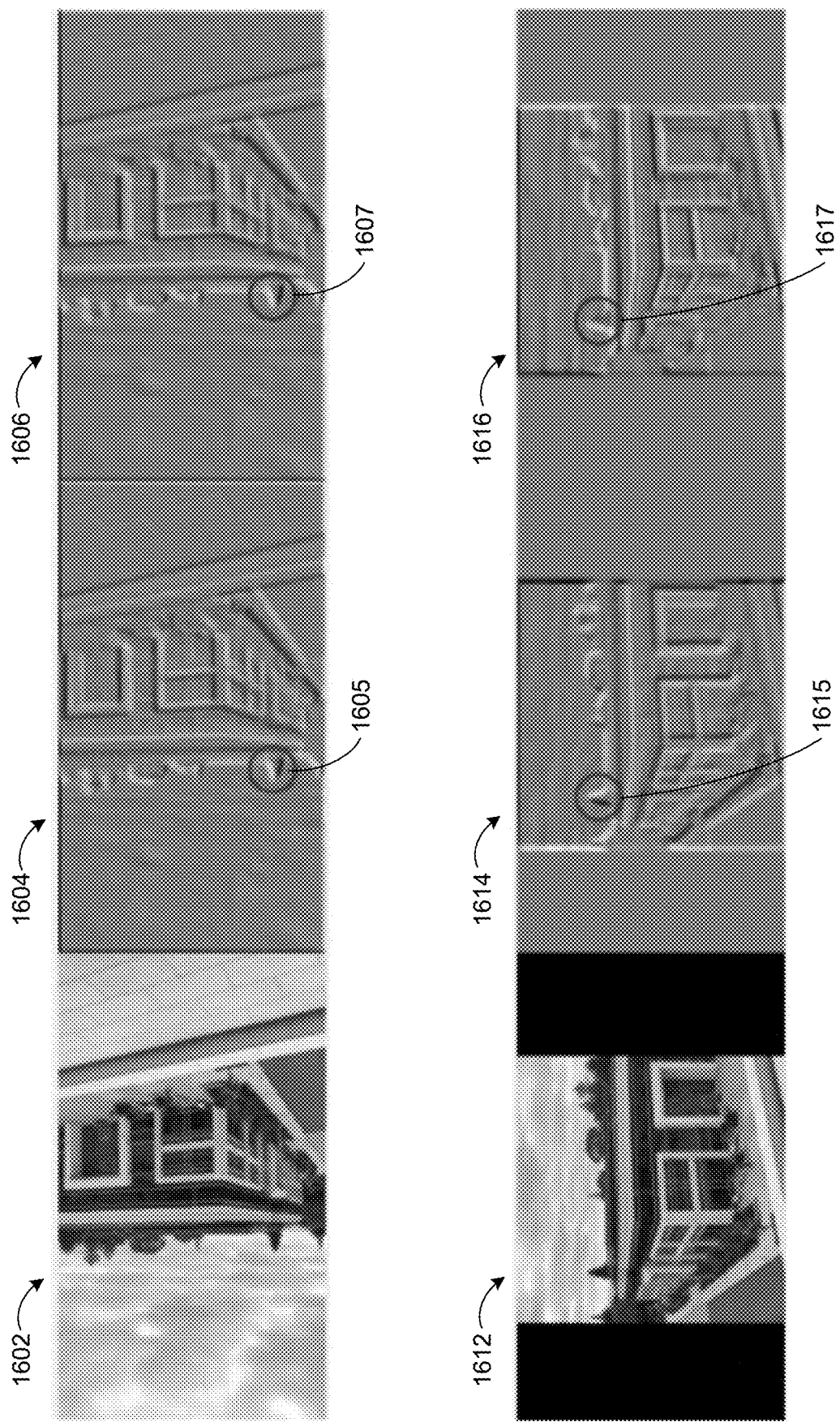
FIGS. 16A-16C illustrate example input images and corresponding responses in accordance with some implementations.
Figure 16B:
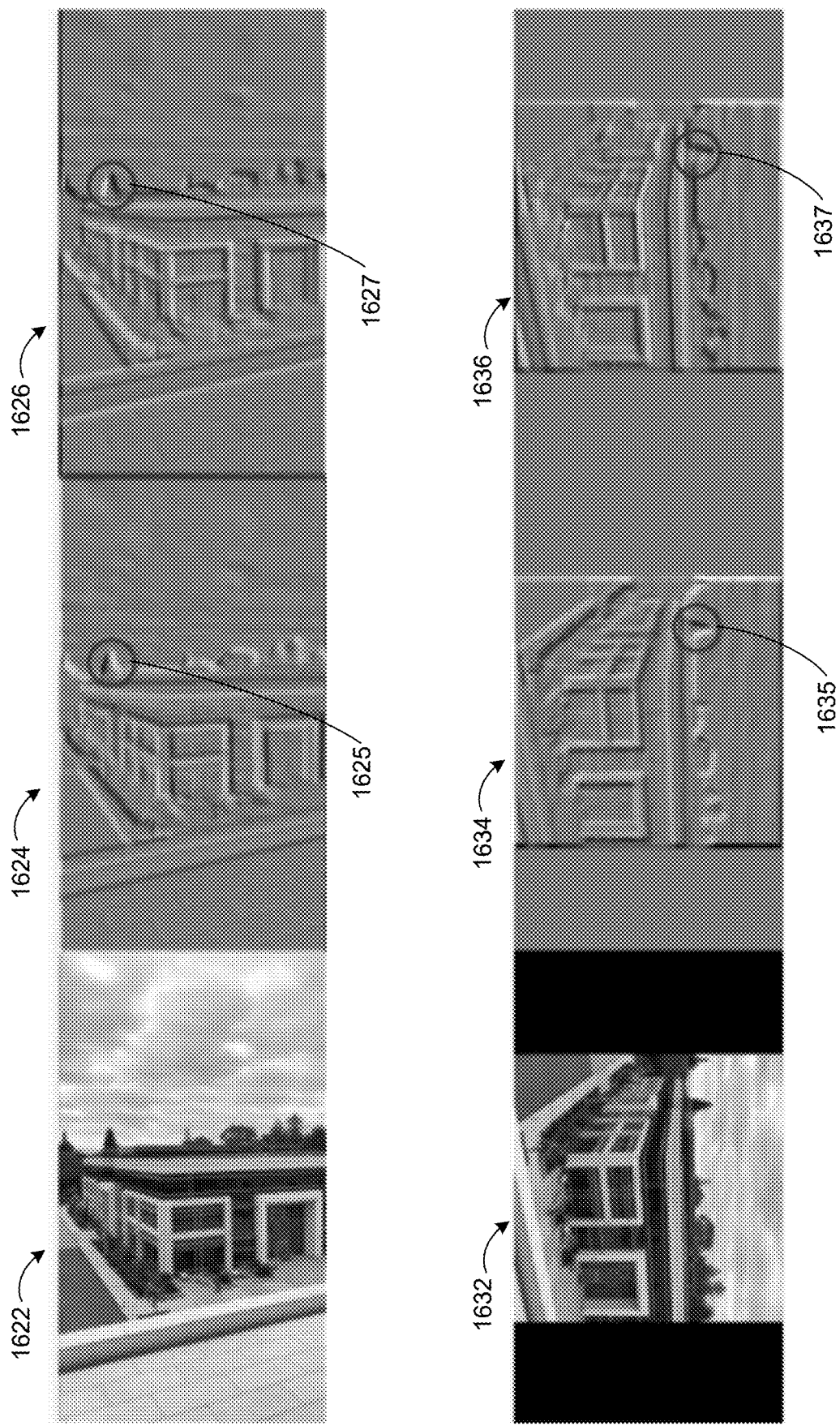
Figure 16C:
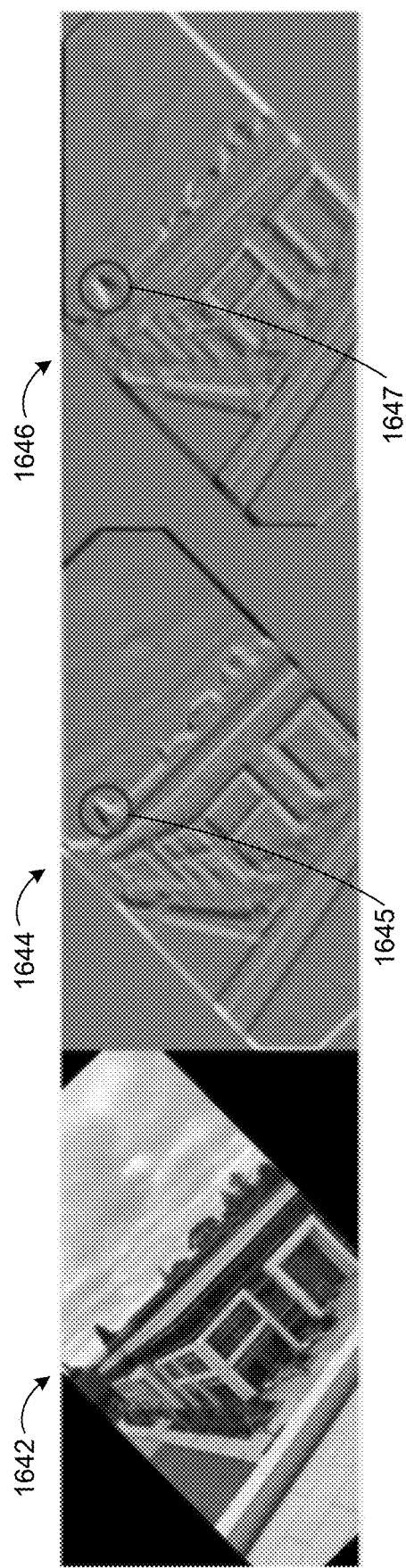

FIGS. 16A-16C illustrate example input images and corresponding responses in accordance with some implementations. FIG. 16A shows a first output response 1604 when applying the input image 1602 to a machine learning sub-system with kernel or response steering functionality and also shows a second output response 1606 when applying the input image 1602 to a machine learning sub-system without kernel or response steering functionality. Initially, the visual features 1605 and 1607 are similar where the left side of a tree is dark, and the right side is bright.

FIG. 16A also shows a first output response 1614 when applying the input image 1612 (e.g., a (clockwise) rotated version of the input image 1602 about the z-axis) to a machine learning sub-system with kernel or response steering functionality and also shows a second output response 1616 when applying the input image 1612 to a machine learning sub-system without kernel or response steering functionality. The visual features 1615 and 1617 diverge when compared against each other. Furthermore, the visual feature 1615 is similar to the visual feature 1605, but the visual feature 1617, where both sides of the features 1605 and 1607 are bright, is different from the visual feature 1607.

FIG. 16B shows a first output response 1624 when applying the input image 1622 (e.g., a rotated version of the input image 1602 about the z-axis) to a machine learning sub-system with kernel or response steering functionality and also shows a second output response 1626 when applying the input image 1622 to a machine learning sub-system without kernel or response steering functionality. The visual features 1625 and 1627 continue to diverge when compared against each other. Furthermore, the visual feature 1625 is similar to the visual feature 1605, but the visual feature 1627 is the inverse of the visual feature 1607.

FIG. 16B shows a first output response 1634 when applying the input image 1632 (e.g., a rotated version of the input image 1602 about the z-axis) to a machine learning sub-system with kernel or response steering functionality and shows a second output response 1636 when applying the input image 1632 to a machine learning sub-system without kernel or response steering functionality. The visual features 1635 and 1637 continue to diverge when compared against each other. Furthermore, the visual feature 1635 is similar to the visual feature 1605, but the visual feature 1637 is different from the visual feature 1607.

FIG. 16C shows a first output response 1644 when applying the input image 1642 (e.g., a rotated version of the input image 1602 about the z-axis) to a machine learning sub-system with kernel or response steering functionality and shows a second output response 1646 when applying the input image 1642 to a machine learning sub-system without kernel or response steering functionality. The visual features 1645 and 1647 continue to diverge when compared against each other. Furthermore, the visual feature 1645 is similar to the visual feature 1605, but the visual feature 1647 is different from the visual feature 1607. As such, the visual features in the output response of the machine learning sub-system with kernel or response steering functionality are invariant to the orientation of the input image.

Figure 17:
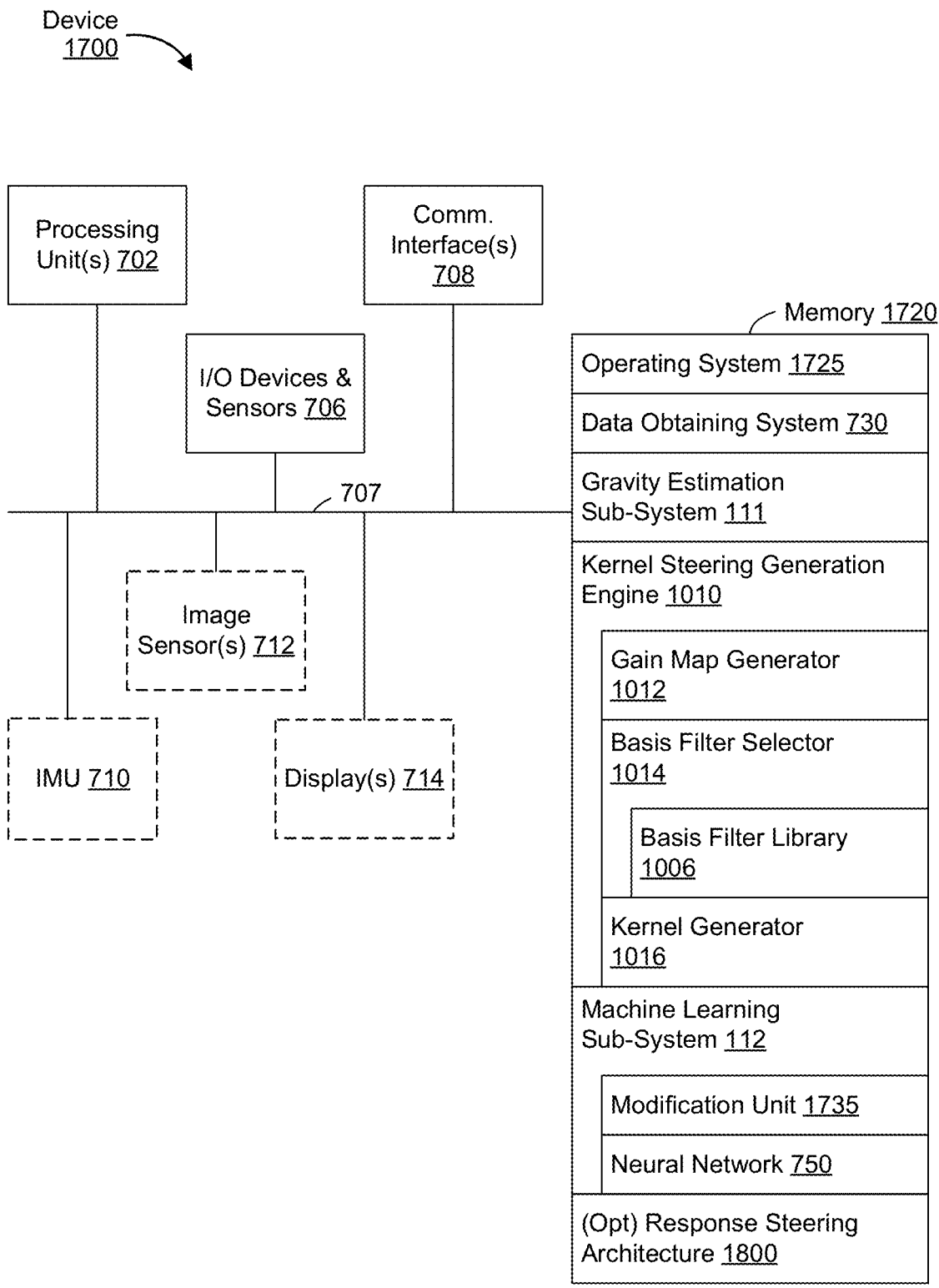
FIG. 17 is a block diagram of an example device in accordance with some implementations.

FIG. 17 is a block diagram of an example device 1700 (e.g., a server, mobile phone, tablet, laptop, head-mounted device (HMD), etc.) in accordance with some implementations. According to some implementations, the device 1700 in FIG. 17 is similar to and adapted from the device 700 in FIG. 7. Thus, similar reference numbers are used in FIGS. 7 and 17 for some components and only the differences herein will be discussed for the sake of brevity.

The memory 1720 includes high-speed random-access memory, such as DRAM, SRAM, DDR RAM, or other random-access solid-state memory devices. In some implementations, the memory 1720 includes non-volatile memory, such as one or more magnetic disk storage devices, optical disk storage devices, flash memory devices, or other non-volatile solid-state storage devices. The memory 1720 optionally includes one or more storage devices remotely located from the one or more processing units 702. The memory 1720 comprises a non-transitory computer readable storage medium. In some implementations, the memory 1720 or the non-transitory computer readable storage medium of the memory 1720 stores the following programs, modules and data structures, or a subset thereof including an optional operating system 1725, the data obtaining system 730, the gravity estimation sub-system 111, the kernel steering engine 1010, the machine learning sub-system 112, and the optional response steering architecture 1800.

The operating system 1725 includes procedures for handling various basic system services and for performing hardware dependent tasks.

In some implementations, the data obtaining system 730 is configured to obtain input image frames (sometimes also herein referred to as "input images," "image data," or simply "images") from a local source (e.g., image frames captured by the one or more image sensors 712 of the device 1700) and/or a remote source (e.g., image frames captured by one or more image sensors of a device different from the device 1700 such a mobile phone, tablet, HMD, scene camera, or the like). To that end, in various implementations, the data obtaining system 730 includes instructions and/or logic therefor, and heuristics and metadata therefor.

In some implementations, the gravity estimation sub-system 111 is configured to determine a gravity direction (sometimes also herein referred to as a "gravity direction estimation") of an environment based on gravity data or measurements (e.g., gravity data from the IMU 710). To that end, in various implementations, the gravity estimation sub-system 111 includes instructions and/or logic therefor, and heuristics and metadata therefor.

In some implementations, the kernel steering engine 1010 is configured to generate steered kernel(s) for per-pixel gain maps based on a gravity direction estimation. To that end, on some implementations, the kernel steering engine 1010 includes a gain map generator 1012, a basis filter selector 1014, and a kernel generator 1016.

In some implementations, the gain map generator 1012 is configured to generate a per-pixel gain map based on an input image and the gravity direction estimation. According to some implementations, the per-pixel gain map indicates the orientation or angle of each pixel within the input image relative to the gravity direction estimation. According to some implementations, the per-pixel gain map corresponds to a portion of a vector field where each pixel is associated with a point in the vector field and a corresponding vector relative to the gravity direction estimation. To that end, in various implementations, the gain map generator 1012 includes instructions and/or logic therefor, and heuristics and metadata therefor.

In some implementations, the basis filter selector 1014 is configured to select a basis filter (or a set of associated basis filters) from the basis filter library 1006. To that end, in various implementations, the basis filter selector 1014 includes instructions and/or logic therefor, and heuristics and metadata therefor.

In some implementations, the kernel generator 1016 is configured to generate a steered kernel (or a set of associated steered kernels) based on the per-pixel gain map and the basis filter. The operation of the kernel generator 1016 is described in more detail above with respect to FIG. 12. To that end, in various implementations, the kernel generator 1016 includes instructions and/or logic therefor, and heuristics and metadata therefor.

In some implementations, the machine learning sub-system 112 is configured to process input data and perform a task in order to provide an output. For example, the machine learning sub-system 112 performs object recognition, segmentation, or the like on input images. In some implementations, the machine learning sub-system 112 includes a neural network 750 such as a convolutional neural network (CNN) (e.g., the neural network 200 in FIG. 2). In some implementations, the machine learning sub-system 112 includes a modification unit 1735 configured to modify operating parameters for at least a subset of the plurality of layers of the machine learning sub-system to include the one or more steered kernels generated by the kernel steering engine 1010. To that end, in various implementations, the machine learning sub-system 112 includes instructions and/or logic therefor, and heuristics and metadata therefor.

In some implementations, the optional response steering architecture 1800 is configured to steer the response based on a gravity-related gain map. The response steering architecture 1800 is described in more detail below with reference to FIG. 18. To that end, in various implementations, the response steering architecture 1800 includes instructions and/or logic therefor, and heuristics and metadata therefor.

Although the data obtaining system 730, the gravity estimation sub-system 111, the kernel steering engine 1010, the machine learning sub-system 112, and the response steering architecture 1800 are shown as residing on a single device (e.g., the device 1700), it should be understood that in other implementations, the data obtaining system 730, the gravity estimation sub-system 111, the kernel steering engine 1010, the machine learning sub-system 112, and the response steering architecture 1800 may be located in separate computing devices. Moreover, FIG. 17 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 17 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 18:
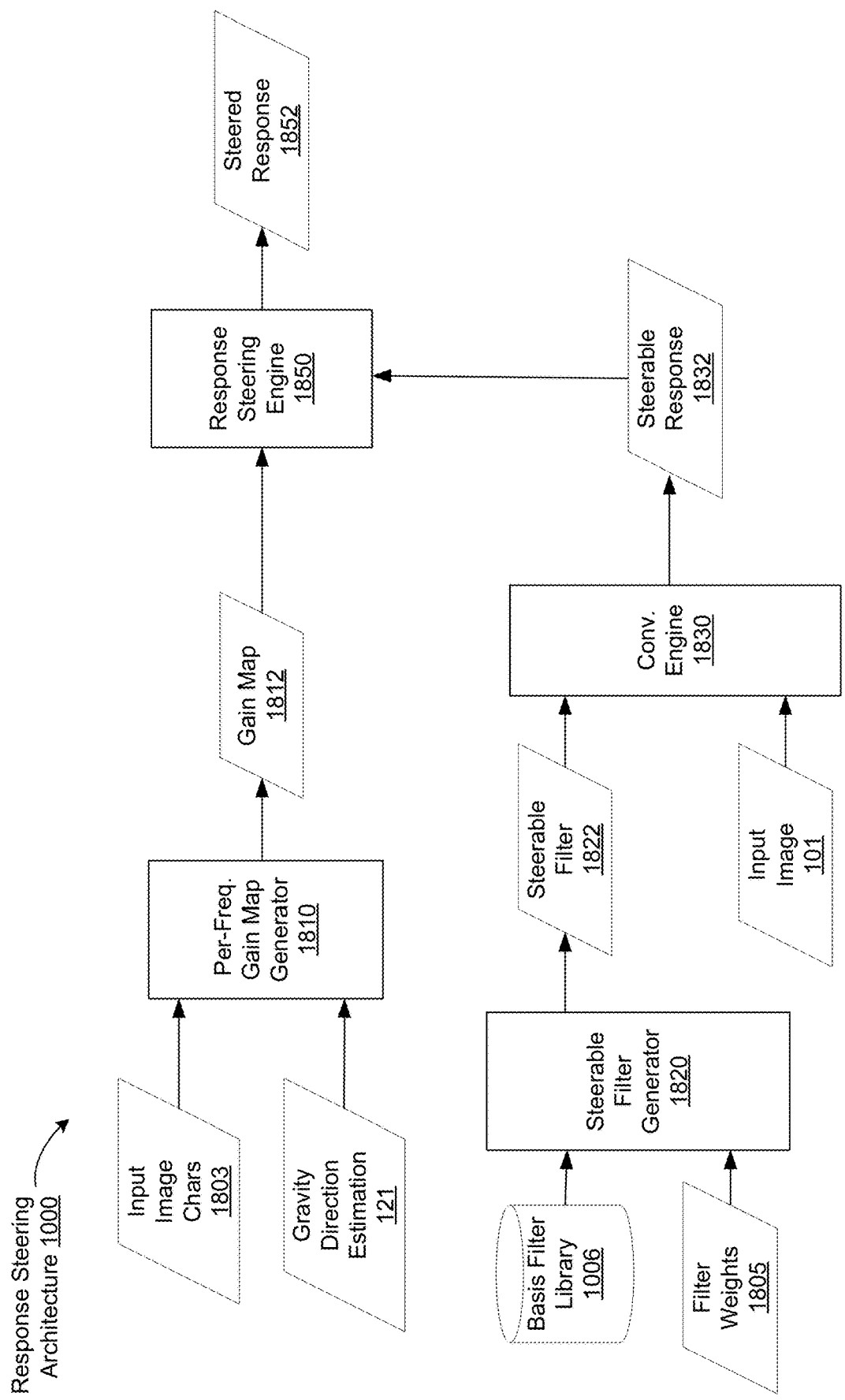
FIG. 18 is a block diagram of a response steering architecture in accordance with some implementations.

FIG. 18 is a block diagram of a response steering architecture 1800 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the response steering architecture 1800 includes a per-frequency gain map generator 1810, a steerable filter generator 1820, a convolutional engine 1830, and a response steering engine 1850. As compared to the kernel steering architecture 1000 that generates a steered kernel for each pixel to produce a response that is substantially invariant to rotation, the response steering architecture 1800 steers the overall response for rotation invariance.

As discussed above with reference to FIG. 1, the gravity estimation sub-system 111 obtains (e.g., receives, retrieves, or generates) the gravity direction estimation 121. In some implementations, the gravity estimation sub-system 111 determines the gravity direction estimation 121 by processing gravity data 103 from an inertial measurement unit (IMU) or a visual inertial odometry (VIO) unit. In some implementations, the gravity estimation sub-system 111 determines the gravity direction estimation 121 by identifying one or more lines in the input image 101 that correspond to real-world vertical lines (e.g., using vanishing point estimation).

In some implementations, the per-frequency gain map generator 1810 is configured to generate a gain map 1812 for each frequency based on the gravity direction estimation 121 and one or more input image characteristics 1803 associated with the input image 101. For example, the one or more input image characteristics 1803 correspond to a resolution of the input image 101 (or associated dimensions), intrinsic camera parameters associated with the camera that captured the input image (e.g., focal length, etc.), and other information related to the input image 101. According to some implementations, the gain map 1812 corresponds to a complex-value and includes one channel per frequency.

In some implementations, the steerable filter generator 1820 is configured to generate a steerable filter 1822 based on one or more basis filters selected from the basis filter library 1006 and one or more filter weights 1805 therefor (e.g., trainable filter weights). For example, the one or more basis filters are defined per-frequency and per-radius as described above with reference to FIGS. 10A and 11.

In some implementations, the convolutional engine 1830 is configured to generate a steerable response 1832 by convolving the steerable filter 1822 with the input image 101 (or a feature map derived therefrom).

In some implementations, the response steering engine 1850 is configured to generate a steered response 1852 based on the gain map 1812 and the steerable response 1832. For example, the response steering engine 1850 generates a component-wise complex product by summing across the frequency channels associated with the gain map 1812, where the steered response 1852 corresponds to the real part of the component-wise complex product.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first image could be termed a second image, and, similarly, a second image could be termed a first image, which changing the meaning of the description, so long as all occurrences of the "first image" are renamed consistently and all occurrences of the "second image" are renamed consistently. The first image and the second image are both images, but they are not the same image.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a computer vision system including a machine learning sub-system, one or more processors, and a non-transitory memory:
   obtaining an input image, wherein the input image is captured by an image sensor having a rotational orientation with respect to a direction of gravity;
   obtaining a gravity direction estimation associated with the rotational orientation of the sensor;
   generating one or more steered kernels based on the input image and the gravity direction estimation;
   after generating the one or more steered kernels, modifying a machine learning sub-system by replacing one or more pre-existing kernels of the machine learning sub-system with the one or more steered kernels; and
   identifying at least one visual feature within the input image by ingesting the input image with the modified machine learning sub-system.

2. The method of claim 1, wherein the machine learning sub-system includes a neural network.

3. The method of claim 2, wherein the neural network is a convolutional neural network (CNN).

4. The method of claim 1, wherein obtaining the gravity direction estimation includes determining the gravity direction estimation.

5. The method of claim 4, wherein determining the gravity direction estimation comprises processing output from one of an inertial measurement unit (IMU) or a visual inertial odometry (VIO) unit.

6. The method of claim 4, wherein determining the gravity direction estimation includes identifying one or more lines in the input image that correspond to real-world vertical lines.

7. The method of claim 6, wherein identifying the one or more lines that correspond to real-world vertical lines includes determining the one or more lines using vanishing point estimation.

8. The method of claim 1, wherein the visual feature is a type of real-world object depicted in the input image.

9. The method of claim 1, wherein the visual feature is a value denoting presence or absence of depiction of a real-world object in the input image.

10. The method of claim 1, wherein the visual feature is a pose of a real-world object depicted in the input image.

11. The method of claim 1, wherein generating the one or more steered kernels based on the input image and the gravity direction estimation includes:

selecting a basis filter from a basis filter library;
generating a per-pixel gain map based on the input image and the gravity direction estimation; and
generating the one or more steered kernels based on the per-pixel gain map and the selected basis filter.

12. The method of claim 1, wherein the one or more steered kernels are generated based on the input image, the gravity direction estimation, and a basis filter.

13. An electronic device including a machine learning sub-system, one or more processors, and a non-transitory memory storing one or more programs, which, when executed by the one or more processors, cause the electronic device to:
obtain an input image, wherein the input image is captured by an image sensor having a rotational orientation with respect to a direction of gravity;
obtain a gravity direction estimation associated with the rotational orientation of the sensor;
generate one or more steered kernels based on the input image and the gravity direction estimation;
after generating the one or more steered kernels, modify a machine learning sub-system by replacing one or more pre-existing kernels of the machine learning sub-system with the one or more steered kernels; and
identify at least one visual feature within the input image by ingesting the input image with the modified machine learning sub-system.

14. The electronic device of claim 13, wherein obtaining the gravity direction estimation includes determining the gravity direction estimation.

15. The electronic device of claim 14, wherein determining the gravity direction estimation comprises processing output from one of an inertial measurement unit (IMU) or a visual inertial odometry (VIO) unit.

16. The electronic device of claim 14, wherein determining the gravity direction estimation includes identifying one or more lines in the input image that correspond to real-world vertical lines.

17. The electronic device of claim 13, wherein generating the one or more steered kernels based on the input image and the gravity direction estimation includes:
selecting a basis filter from a basis filter library;
generating a per-pixel gain map based on the input image and the gravity direction estimation; and
generating the one or more steered kernels based on the per-pixel gain map and the selected basis filter.

18. The electronic device of claim 13, wherein the one or more steered kernels are generated based on the input image, the gravity direction estimation, and a basis filter.

19. A non-transitory memory storing one or more programs, which, when executed by one or more processors of an electronic device with a machine learning sub-system, cause the electronic device to:
obtain an input image, wherein the input image is captured by an image sensor having a rotational orientation with respect to a direction of gravity;
obtain a gravity direction estimation associated with the rotational orientation of the sensor;
generate one or more steered kernels based on the input image and the gravity direction estimation;
after generating the one or more steered kernels, modify a machine learning sub-system by replacing one or more pre-existing kernels of the machine learning sub-system with the one or more steered kernels; and
identify at least one visual feature within the input image by ingesting the input image with the modified machine learning sub-system.

20. The non-transitory memory of claim 19, wherein obtaining the gravity direction estimation includes determining the gravity direction estimation.

21. The non-transitory memory of claim 19, wherein determining the gravity direction estimation comprises processing output from one of an inertial measurement unit (IMU) or a visual inertial odometry (VIO) unit.

22. The non-transitory memory of claim 19, wherein determining the gravity direction estimation includes identifying one or more lines in the input image that correspond to real-world vertical lines.

23. The non-transitory memory of claim 19, wherein generating the one or more steered kernels based on the input image and the gravity direction estimation includes:
selecting a basis filter from a basis filter library;
generating a per-pixel gain map based on the input image and the gravity direction estimation; and
generating the one or more steered kernels based on the per-pixel gain map and the selected basis filter.

24. The non-transitory memory of claim 19, wherein the one or more steered kernels are generated based on the input image, the gravity direction estimation, and a basis filter.

* * * * *